(12) United States Patent
Moriya et al.

(10) Patent No.: US 7,110,599 B1
(45) Date of Patent: Sep. 19, 2006

(54) IMAGE DATA RETOUCHING APPARATUS, IMAGE DATA RETOUCHING METHOD, AND MEDIUM ON WHICH IMAGE DATA RETOUCHING PROGRAM IS RECORDED

(75) Inventors: Hidekuni Moriya, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/674,620

(22) PCT Filed: Mar. 6, 2000

(86) PCT No.: PCT/JP00/01343

§ 371 (c)(1),
(2), (4) Date: Nov. 3, 2000

(87) PCT Pub. No.: WO00/54492

PCT Pub. Date: Sep. 14, 2000

(30) Foreign Application Priority Data

Mar. 5, 1999 (JP) ................... 11-058326
Mar. 5, 1999 (JP) ................... 11-058327

(51) Int. Cl.
*G06K 9/00* (2006.01)

(52) U.S. Cl. .................. 382/170; 358/522; 348/672

(58) Field of Classification Search ........... 382/260, 382/269, 275, 170, 162; 358/522; 348/672
See application file for complete search history.

(56) References Cited

U.S. PATENT DOCUMENTS

| | | | | |
|---|---|---|---|---|
| 4,051,536 A | 9/1977 | Roetling | ........................ | 358/298 |
| 4,194,221 A | 3/1980 | Stoffel | ........................ | 358/283 |
| 4,783,840 A * | 11/1988 | Song | ........................ | 382/261 |
| 4,942,480 A | 7/1990 | Shu | ........................ | 358/455 |
| 5,014,124 A | 5/1991 | Fujisawa | ........................ | 358/75 |
| 5,185,812 A * | 2/1993 | Yamashita et al. | ........................ | 382/145 |
| 5,245,677 A * | 9/1993 | Lepore et al. | ........................ | 382/48 |
| 5,659,402 A * | 8/1997 | Fujita et al. | ........................ | 358/467 |
| 5,892,852 A * | 4/1999 | Namizuka et al. | ........................ | 382/254 |
| 6,392,759 B1 * | 5/2002 | Kuwata et al. | ........................ | 358/1.9 |

FOREIGN PATENT DOCUMENTS

| | | |
|---|---|---|
| EP | 0 663 758 | 7/1995 |
| EP | 0 891 075 A | 1/1999 |
| EP | 0 902 585 A | 3/1999 |

(Continued)

OTHER PUBLICATIONS

International Search Report.

(Continued)

*Primary Examiner*—Bhavesh M. Mehta
*Assistant Examiner*—Dennis Rosario
(74) *Attorney, Agent, or Firm*—Sughrue Mion, PLLC

(57) ABSTRACT

In the present invention, image data from an image input device, including differences of tone levels of picture elements constituting these image data from surrounding picture elements, are figured out and the distribution of these differences of tone levels is prepared. Then, integrated processing, based on this distribution, makes it possible to determine whether each picture element is an edge picture element, a moiré picture element or an intermediate picture element. According to the determination, a sharpening filter is applied if the picture elements are edge picture elements, a smoothing filter is applied if they are moiré picture elements, or the tones of the original image are held if they are intermediate picture elements. This way of image data retouching makes it possible to carry out the whole execution from determination to retouching in a serial process.

13 Claims, 22 Drawing Sheets

Difference of tone levels

| 16 | 28 | 32 | 9 | -2 |
|---|---|---|---|---|
| 34 | -14 | -9 | 2 | 6 |
| 21 | 9 | 0 | -3 | 9 |
| 5 | 6 | 18 | 29 | 33 |
| 16 | 21 | 10 | 15 | 21 |

FOREIGN PATENT DOCUMENTS

| | | |
|---|---:|---:|
| JP | 61-80971 | 4/1986 |
| JP | 63-250274 | 10/1988 |
| JP | 2-84879 | 3/1990 |
| JP | 2-98280 | 4/1990 |
| JP | 2-186876 | 7/1990 |
| JP | 5-328121 | 12/1993 |
| JP | 6-62230 | 3/1994 |
| JP | 7-212578 | 8/1995 |
| JP | 10-294862 | 11/1998 |

OTHER PUBLICATIONS

Patent Abstracts of Japan 02084879 Mar. 26, 1990.
Patent Abstracts of Japan 07212578 Aug. 11, 1995.
Patent Abstracts of Japan 05328121 Dec. 10, 1993.
Patent Abstracts of Japan 06062230 Mar. 4, 1994.
Patent Abstracts of Japan 10294862 Nov. 4, 1998.
Patent Abstracts of Japan 02098280 Apr. 10, 1990.
Patent Abstracts of Japan 63250274 Oct. 18, 1988.
Patent Abstracts of Japan 02186876 Jul. 23, 1990.
Patent Abstracts of Japan 61080971 Apr. 24, 1986.

* cited by examiner

Original image

|   | -2 | -1 | 0 | 1 | 2 |
|---|----|----|----|----|----|
| 2 | 80 | 92 | 96 | 73 | 62 |
| 1 | 98 | 50 | 55 | 66 | 70 |
| 0 | 85 | 73 | 64 | 61 | 73 |
| -1 | 69 | 70 | 82 | 93 | 97 |
| -2 | 80 | 85 | 74 | 79 | 85 |

Difference of tone levels

| 16 | 28 | 32 | 9 | -2 |
|----|----|----|----|----|
| 34 | -14 | -9 | 2 | 6 |
| 21 | 9 | 0 | -3 | 9 |
| 5 | 6 | 18 | 29 | 33 |
| 16 | 21 | 10 | 15 | 21 |

Distribution

Luminance

RGB

FIG.15A

| 0 | 0 | 0 | 1 | 1 | 2 | 0 | 0 | 2 | 2 |
|---|---|---|---|---|---|---|---|---|---|
| 0 | 0 | 0 | 1 | 1 | 2 | 2 | 2 | 1 | 1 |
| 1 | 1 | 1 | 1 | 1 | 2 | 0 | 0 | 1 | 1 |
| 1 | 1 | 1 | 1 | 1 | 2 | 0 | 0 | 1 | 1 |
| 2 | 0 | 2 | 2 | 2 | 0 | 2 | 2 | 1 | 1 |
| 2 | 0 | 2 | 2 | 2 | 0 | 2 | 2 | 1 | 1 |
|   |   |   |   |   |   |   |   | 1 | 1 |

Edge : 1
Moiré : 2
Intermediate : 0

FIG.15B

| 0 | 0 | 0 | 1 | 1 | 1 |
|---|---|---|---|---|---|
| 0 | 0 | 0 | 1 | 1 | 1 |
| 1 | 1 | 1 | 2 | 0 | 0 |
| 2 | 2 | 2 | 0 | 2 | 2 |
| 2 | 2 | 2 | 0 | 2 | 0 |

R

| 1 | 1 | 1 | 2 | 2 | 2 |
|---|---|---|---|---|---|
| 1 | 1 | 0 | 2 | 2 | 2 |
| 1 | 0 | 1 | 2 | 0 | 2 |
| 1 | 0 | 2 | 1 | 0 | 2 |
| 2 | 2 | 0 |   | 1 | 1 |

G

| 0 | 0 | 2 | 2 | 1 | 0 |
|---|---|---|---|---|---|
| 1 | 0 |   | 2 | 1 | 0 | 1 |
| 2 | 0 | 0 | 0 | 2 | 2 |
| 1 | 1 | 1 | 1 | 2 | 2 |
| 1 | 2 | 0 | 2 | 2 | 1 | 1 |

B

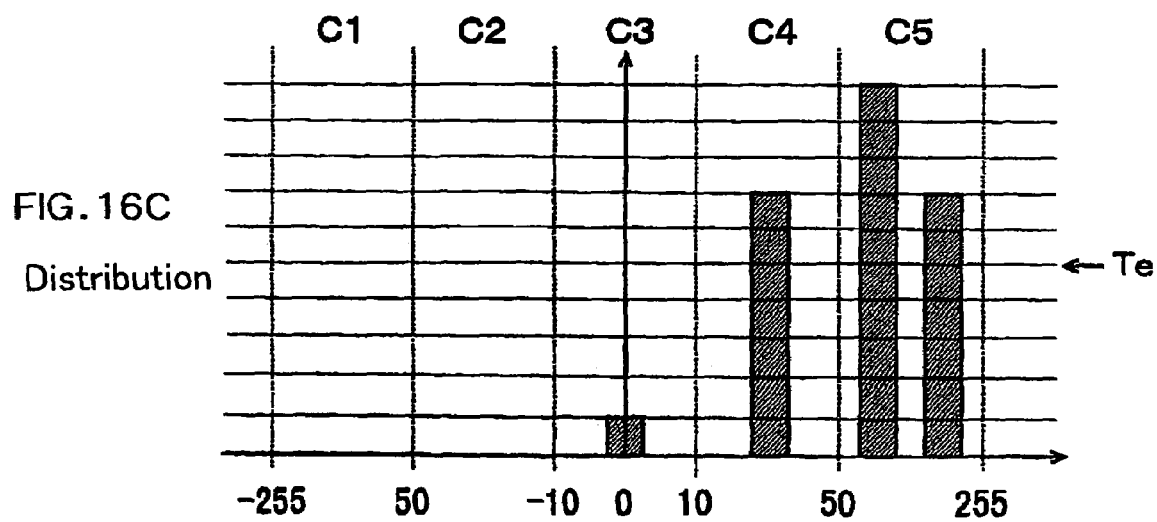
FIG. 16A Original image
FIG. 16B Difference of tone levels
FIG. 16C Distribution

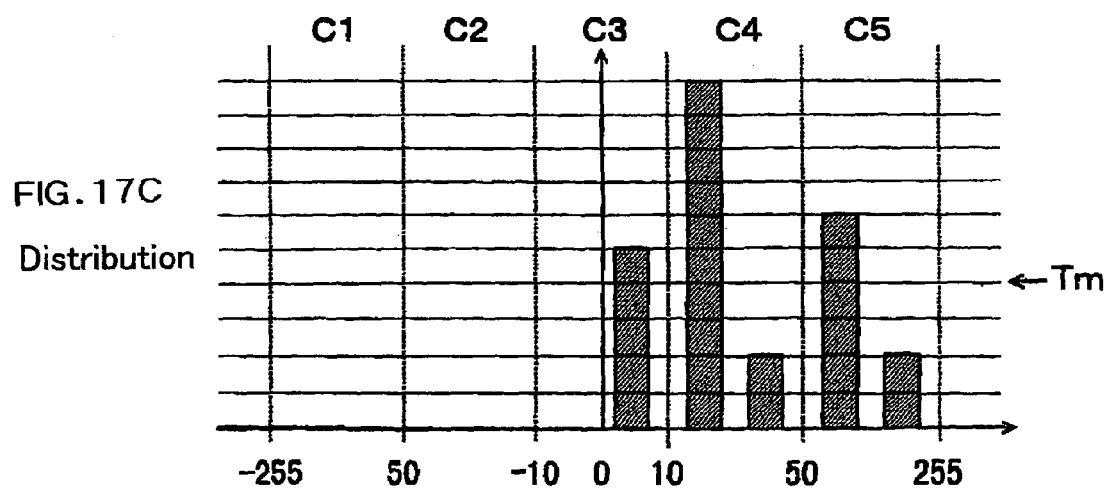
FIG. 17A Original image
FIG. 17B Difference of tone levels
FIG. 17C Distribution

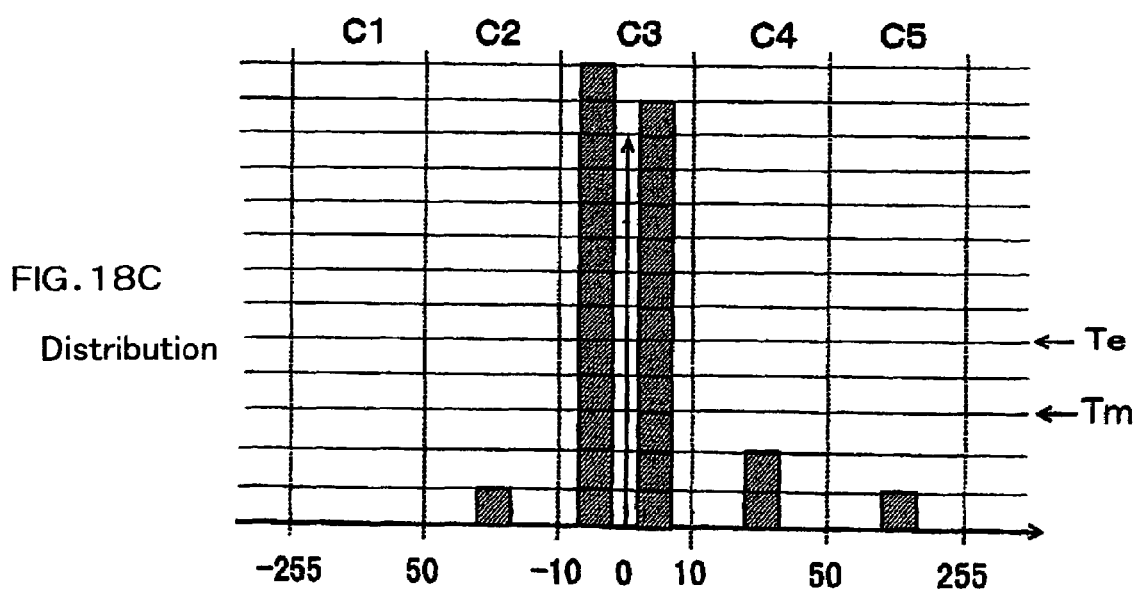
FIG.18A Original image
FIG.18B Difference of tone levels
FIG.18C Distribution Sharpening filter

IMAGE DATA RETOUCHING APPARATUS, IMAGE DATA RETOUCHING METHOD, AND MEDIUM ON WHICH IMAGE DATA RETOUCHING PROGRAM IS RECORDED

TECHNICAL FIELD

The present invention relates to an image data retouching apparatus, an image data retouching method and a medium on which an image data retouching program is recorded, all for executing image data retouching according to the characteristics of individual picture elements.

BACKGROUND ART

In order to improve the quality of images picked up by a scanner or a digital camera, image data on these images are subjected to retouching. More specifically, digital data are put into a computer, on which a photo-retouching application is actuated to emphasize desired color contents and/or contrast. Or prescribed color contents are removed to weaken their influence. These are some of the various retouching options that are available.

For document images of which the data to be retouched mainly consist of characters or photographic images mainly composed of photographic elements, it is sufficient to retouch the image data constituting their principal parts, and the required processing is relatively simple. On the other hand, as DTP techniques have become highly developed to make possible ready preparation of presentation documents, in which characters and color graphics are integrated, or album images, in which characters and photographs are similarly arranged, there emerge frequent needs for so-called mixed images, in which characters and photographic elements are mixed.

Character elements of image data in such mixed images tend to have intermediate tones on their borders with the background, and consequently the characters often become blurred and poor in readability. On the other hand, photographic elements are subject to periodic noise attributable to high-frequency components, and this noise sometimes invites visually perceivable deterioration of picture quality.

Accordingly, when image data in mixed images are to be retouched, the contrast on borders between characters and their background is emphasized to clear the blurring of character elements. This can serve to enhance the readability of the characters. To do this, prescribed sharpening to emphasize contrast is executed on each picture element on the borders.

On the other hand for photographic elements, as the aforementioned noise consists of high-frequency components, each picture element with noise is subjected to a prescribed smoothing procedure to reduce high-frequency components.

In this context, border zones of character elements are generally referred to as edge picture elements, and the periodic noise attributable high-frequency components arising in photographic elements, as moiré picture elements.

Image data retouching applicable to such mixed images will be outlined below. First, image data of images picked up by a scanner or a digital camera are acquired as image data which express picture elements in a dot matrix form in multiple tones, and picture elements constituting these image data are successively scanned to compute differences of tone levels from surrounding picture elements in a prescribed range with reference to a criterion picture element. If there are many picture elements with large differences of tone levels, such elements are extracted as edge picture elements. With the positions of these extracted edge picture elements being taken into consideration, the range of edge picture elements to be sharpened are demarcated and determined.

Then, the picture elements constituting the image data are successively scanned again to compute differences of tone levels of picture elements in the prescribed range from the surrounding picture elements with reference to a criterion picture element, and if there are many picture elements whose differences of tone levels are relatively small, they are extracted as moiré picture elements. With the positions of these extracted moiré picture elements being taken into consideration, the range of moiré picture elements to be smoothed are demarcated and determined. Once the range of edge picture elements and that of moiré picture elements are determined in this manner, sharpening and smoothing are executed. In this case, the sequence is that sharpening is executed first, followed by smoothing.

At the sharpening step, the range of edge picture elements is extracted and sharpened, and the sharpened range of edge picture elements is held.

At the smoothing step, the range of moiré picture elements is extracted and smoothed, and the smoothed range of moiré picture elements is held. Thus, ranges to be sharpened and ranges to be smoothed, both distinguished element by element, are extracted individually, and processed individually.

And image data in each range having been appropriately processed and held are relatively positioned for integration, and retouched image data are thereby generated.

DISCLOSURE OF THE INVENTION

In the above described processing for image data retouching, the determination of edge picture elements and that of moiré picture elements are executed in separate procedures, and the range of edge picture elements and that of moiré picture elements thereby demarcated are subjected to image data retouching, again in separate procedures. Therefore, this way of processing involves the problem that the procedures to determine edge picture elements and moiré picture elements and those to retouch the image data of picture elements are complex in configuration. This inevitable complexity of processing configuration results in slow processing speed and consequent inconvenience for the user.

The present invention, attempted in view of the above-noted problems, is intended to provide a medium on which an image data retouching program is recorded, an image data retouching apparatus and an image data retouching method, all capable of simplifying and increasing the speed of processing by efficiently executing the determination of the characteristic of picture elements, including whether they are edge picture elements or moiré picture elements and facilitating the retouching of corresponding image data.

In order to achieve the above-stated object, according to Claim 1 of the present invention, there is provided an image data retouching apparatus for determining the characteristic of each picture element in image data which express images in a dot matrix form in multiple tones and retouching each picture element in a way appropriate to its characteristic, the apparatus comprising: an image data acquisition unit for acquiring the image data; a picture element characteristic determining unit for figuring out the distribution of differences of tone levels between object picture elements, which are the picture elements of the image data acquired by the image data acquisition unit, and neighboring picture elements in a prescribed range around the object picture elements, and determining the characteristic of the object picture elements by comparing the distribution so figured out and a prescribed model distribution; and an image data retouching unit for executing prescribed image processing according to the characteristic of picture elements determined by the picture element characteristic determining unit.

In the apparatus configured as described above according to Claim 1 of the invention, the image data acquisition unit acquires image data which express images in a dot matrix form in multiple tones. The picture element characteristic determining unit determines the characteristic of each of the picture elements in the image data. In doing so, the unit figures out the distribution of differences of tone levels of these picture elements as object picture elements from surrounding picture elements in the prescribed range around the object picture elements. The distribution so figured out is compared with the prescribed model distribution to determine the characteristics of the object picture elements, and the image data retouching unit executes the prescribed image processing according to the determined characteristics of the picture elements.

Thus, instead of altering the way of determination according to the characteristic, the distribution of differences of tone levels from neighboring picture elements is figured out and the characteristic of picture elements is determined according to the pattern of that distribution.

Here, the picture element characteristic determining unit figures out the distribution of differences of tone levels from object picture elements in a prescribed range around the object picture elements, and compares this distribution with the model distribution from a statistical point of view. As one of its conceivable specific example, Claim 2 of the invention provides for a picture element characteristic determining unit in the image data retouching apparatus described in Claim 1, uses the distribution in a range where there are less differences of tone levels and that in a range where there are more differences of tone levels.

In the above-described configuration according to Claim 2 of the invention, the frequency distributions of differences of tone levels are figured out, not for individual tone levels but the distribution in a range where there are less differences of tone levels and the distribution in a range where there are more differences of tone levels. If the characteristic of picture element to be determined is the presence or absence of edges, since edges are distributed where differences of tone levels are greater, many edges will necessarily be found distributed in a range where the differences are greater. Or if moiré is found to have arisen, picture elements with less differences of tone levels must have occurred in a range of minute differences. Of course a similar trend may be found where there is no edge or moiré, but this is no more than one of available criteria, and this criterion can be combined with some other technique of determination to enhance the precision of determination. Accordingly, this corresponds to one of available model distributions.

As another example of picture element characteristic determining unit in this sense, according to Claim 3 of the invention, in the above-described image data retouching apparatus according to Claim 2 of the invention, the picture element characteristic determining unit uses the positive or negative polarization of the distribution.

The configuration according to Claim 3 of the invention bases the determination on whether the distribution of difference of tone levels is polarized toward the positive range or the negative range.

For instance, since an edge is a range where picture elements with large differences of tone levels consecutively occur, in an overall outlook there is a side where differences of tone levels are greater and a side where the differences are smaller. If the object picture elements are on the side where differences of tone levels are greater, the distribution of the differences will tend to be close to zero and polarize toward the positive side. Or if the object picture elements are on the side where differences of tone levels are smaller, the distribution of the differences will tend to be close to zero and polarize toward the negative side. Accordingly, positive or negative polarization can be regarded as a model distribution, and utilized as such for the determination.

As an example of configuration specifically realizing the above-described way of determination, according to Claim 4 of the invention, in the image data retouching apparatus according to Claim 3 of the invention, the picture element characteristic determining unit determines that, if many picture elements with large differences of tone levels are extensively distributed and this distribution is polarized to either the positive or the negative side, they are edge picture elements.

In other words, the distribution in the range of large differences of tone levels and the positive or negative polarization are compared as the basis of determining given picture elements to be edge picture elements.

Further, according to Claim 5 of the invention, in the image data retouching apparatus according to Claim 4 of the invention, the image data retouching unit has a configuration to execute sharpening of pictures when the object picture elements are determined to be edge picture elements.

If the object picture elements are determined to be edge picture elements, the determination is utilized as it is to execute sharpening to prevent the edges from being dulled.

According to Claim 6 of the invention, in the image data retouching apparatus according to Claim 5 of the invention, the configuration is such that the sharpening is accomplished by a sharpening filter in which a matrix having a prescribed number of picture elements centering on the object picture elements is formed, and a prescribed coefficient is set in the position of each picture in the matrix to emphasize that object picture element.

As picture elements in a prescribed range centering on the object picture elements are the objects of determination, if a sharpening filter to process picture elements in the same prescribed range is used, the determination of the picture element characteristic and image processing will well match each other, resulting in efficient execution of sharpening.

Another example of configuration specifically realizing the above-described way of determination, according to Claim 7 of the invention, in the image data retouching apparatus according to Claim 3 or 4 of the invention, the picture element characteristic determining unit determines that, if many picture elements with small differences of tone levels are extensively distributed and this distribution is polarized to either the positive or the negative side, they are moiré picture elements.

Thus, by combining the distribution of picture elements with small differences of tone levels and the polarization of distribution to either the positive or the negative side, the pertinent picture elements are determined to be moiré picture elements.

According to Claim 8 of the invention, in the image data retouching apparatus according to Claim 7 of the invention, the image data retouching unit has a configuration to execute smoothing of pictures when the object picture elements are determined to be moiré picture elements.

If the object picture elements are determined to be moiré picture elements, the determination is utilized as it is to execute smoothing to eliminate moiré.

According to Claim 8 of the invention, in the image data retouching apparatus according to Claim 8 of the invention, the configuration is such that the smoothing is accomplished by a smoothing filter in which a matrix having a prescribed number of picture elements centering on the object picture elements is formed, and a prescribed coefficient is set in the position of each picture element in the matrix to approximately average the object picture elements.

For moiré picture elements as well, if determination and smoothing with the smoothing filter are applied to process picture elements in a prescribed range centering on the object picture elements, the determination of picture element characteristics and image processing will well match each other, resulting in efficient execution of smoothing.

According to Claim 10 of the invention, in the image data retouching apparatus according to any of Claims 1 through 9, the image data retouching unit obtains retouching values for the luminance of the image data, and retouches the image data by adding the retouching value of the tone value of each element color.

If in the above-described configuration according to Claim 10 of the invention each picture element is composed of an element color, a retouching value for the computed luminance of each picture element is generated, and the luminance retouching value is added to the tone value of the element color of each element color to execute retouching of image data. Thus, retouching is carried out on the basis of a luminance value computed from each element color, and the resultant luminance-based retouched data are caused to reflect in the element colors.

Incidentally, the distribution of differences of tone levels may as well be figured out by utilizing the concept of vector value. For instance, differences of tone levels of the object picture element from surrounding picture elements in a prescribed range, which are first to be determined, and computed as vector values and, on the basis of the distribution of these vector values, the total number of surrounding picture elements whose vector values are greater and that of surrounding picture elements whose vector values are smaller are compared. Object picture elements surrounded by a relatively large number of picture elements whose vector values are greater are determined to be edge picture elements, and object picture elements surrounded by a relatively large number of picture elements whose vector values are smaller are determined to be moiré picture elements. In executing this determining procedure, the picture element characteristic determining unit sequentially scans all the pictures.

After the determination of each picture element as to whether it is an edge picture element or a moiré picture element is completed, the image data retouching unit subjects those picture elements determined to be edge picture elements to prescribed sharpening and those determined to be moiré picture elements to prescribed smoothing. Similarly, the image data retouching unit, like the picture element characteristic determining unit sequentially scans all the picture elements to execute retouching of image data. Thus it determines each picture element to be an edge picture element or a moiré picture element, and sharpens it if it is an edge picture element or smoothes it if it is a moiré picture element.

In this manner, determination of edge picture elements and moiré picture elements and retouching of image data can be executed in an integrated process.

On the other hand, the prescribed surrounding picture elements, in consideration of the range of likely impact on the picture elements to undergo determination or that of likely impact from the object picture elements, may be a picture element set constituting a 3*3 matrix, or one constituting a 5*5 matrix, around the object picture element, and the number of columns and rows making up the matrix may be altered as appropriate. Of course, the constitution of the range need not be limited to the above-described set of directly affecting or affected picture elements, but the range may be expanded or compressed as appropriate.

Also, the mode in which the picture element characteristic determining unit determines the relative magnitude of a vector value may use as the reference a prescribed threshold of the average of vector values. The reference may as well be the standard deviation, mode or median identified in figuring out the distribution of vector values, and may be altered as appropriate. Of course, the ranges of reference may be more than two, including a range where vector values are judged to be greater, another where they are judged to be small, and still another range.

The picture element characteristic determining unit may either determine the relative dominance of picture elements with greater or smaller vector values by simply comparing the numbers of picture elements with greater vector values and of ones with smaller vector values or the relative dominance of picture elements, divided into a greater number set and a smaller number set, whose cumulative total surpasses a prescribed threshold.

The image data retouching unit may execute sharpening by either emphasizing, relative to surrounding picture elements, the color components of picture elements determined to be edge picture elements or taking into account color components of surrounding picture elements and emphasizing the object picture elements relative to surrounding picture elements whose color components are taken into account in emphasizing the object picture elements. The latter case uses convolution by which the surrounding picture elements and the object picture element are multiplied by a prescribed coefficient and the multiples are added together. In such a case, the aforementioned prescribed matrix of surrounding picture elements is utilized.

Similarly, the image data retouching unit may execute smoothing either by somewhat adjusting the intensities of color components of what have been determined to be moiré picture elements or by taking into account the color components of surrounding picture elements in the smoothing process, i.e. by also averaging the differences of tone levels from the surrounding picture elements. The latter case uses convolution by which the surrounding picture elements and the object picture element are multiplied by a prescribed coefficient and the multiples are added together. In such a case, the aforementioned prescribed matrix of surrounding picture elements is utilized.

It is sufficient for the image data acquisition unit to be able to acquire image data which express images in picture elements in a dot matrix form in multiple tones. Therefore, the input source of images may be a scanner, a digital camera or any device from which image data which express images in picture elements in a dot matrix form in multiple tones can be acquired, and the input source can be altered as appropriate.

The images may be either monochrome or color. For color images, there is no particular limitation as to the setting of the coordinate system in chromatic space or the range of tones.

Depending on how vector values based on differences of tone levels between the object picture element and picture elements surrounding them, there may be some picture elements which can be determined as neither edge picture elements nor moiré picture elements. Such picture elements differ little from surrounding picture elements in tone, it may sometimes obstruct accurate image data retouching to handle them as either edge picture elements or moiré picture elements. From this point of view, the configuration for determination may be such that picture elements of which a relatively large number have vector values smaller than those of what are determined to be moiré picture elements are determined to be intermediate picture elements, which are neither edge picture elements nor moiré picture elements.

In such a configuration, the picture element characteristic determining unit determines to be intermediate picture elements those picture elements of which a relatively large number have vector values smaller than those of what are determined to be moiré picture elements, which are neither edge picture elements nor moiré picture elements. Therefore, the picture element characteristic determining unit computes vector values, sets with respect to these vector values what leads to determination of edge picture elements, what leads to determination of moiré picture elements and what leads to determination of intermediate picture elements, and handle those picture elements whose vector values are smaller than those corresponding to moiré picture elements as intermediate picture elements.

As a specific example of configuration in which the picture element characteristic determining unit computes luminance values from differences of tone levels, the luminance of each of the picture elements is computed, and the differences of tone levels of these luminance values can be computed as the vector values.

In such a configuration, the picture element characteristic determining unit computes by a prescribed formula luminance values from data on color components constituting image data acquired by the image data acquisition unit. On the basis of these luminance values, it computes differences of tone levels as vector values, and executes determination of edge picture elements, moiré picture elements and intermediate picture elements.

As another specific example of configuration in which the picture element characteristic determining unit computes luminance values from differences of tone levels, each picture element is separated into elements colors, and the difference of tone levels of each element color into which the picture element has been separated can be computed as the vector value.

In such a configuration, the picture element characteristic determining unit separates each picture element into element colors, and computes the differences of tone levels of the separated element colors as the vector values. Here the element colors mean the color components constituting picture elements, i.e. R (red), G (green) and B (blue). When the characteristic of each picture element is to be determined from the vector value, what constitutes an edge picture element out of one element color may be determined to be an edge picture element, what constitutes an edge picture element out of two element colors may be determined to be an edge picture element, or only what constitutes an edge picture element out of three element colors may be determined to be an edge picture element, i.e. only what constitutes an edge picture element out of all the element colors may be determined to be an edge picture element. Therefore, this method of determination may be altered as appropriate.

As one example of handling by the image data retouching unit of what have been determined by the picture element characteristic determining unit as intermediate picture elements, the configuration may be such that these intermediate picture elements are subjected to no image data retouching, either sharpening or smoothing.

In such a configuration, the image data retouching unit executes no image data retouching, either sharpening or smoothing on what have been determined by the picture element characteristic determining unit as intermediate picture elements. Thus, it holds the level of the picture elements corresponding to the image data acquired by the image data acquisition unit.

Image data here often can provide various kinds of information, but the data to be used need not be fixed. For example, according to Claim 11 of the invention, the configuration is such that, in the image data retouching apparatus according to any of Claims 1 through 10, in retouching image data of each picture element, an image data attribute specifying unit is caused to execute acquisition of attribute specification for the image data to be handled, and the picture element characteristic determining unit and the image data retouching unit are caused to execute their respective functions on the basis of the image data having the attribute acquired by the image data attribute specifying unit.

According to the prior art, the attribute of the image data to be retouched is fixed. Namely, if the attribute is based on luminance signals, the luminance signals of the image data are retouched, or if it is based on RGB signals, the RGB signals of the image data are retouched.

In such a case, where the user desires an output of high quality, if image data are retouched on the basis of luminance signals, the output will be inferior to that of image data retouching based on RGB signals. Or where the user desires image data retouching in a short period of time, if image data are retouched on the basis of RGB signals, the execution will take a longer time than when image data are retouched on the basis of luminance signals. Thus, there is the problem that the fixation of the attribute may result in failure to satisfy the user's requirement.

In the above-described configuration according to Claim 11 of the invention, the specification of the attribute of image data to be handled by the image data attribute specifying unit is acquired, and the picture element characteristic determining unit and the image data retouching unit are caused to execute their respective functions on the basis of the image data having the attribute acquired by the image data attribute specifying unit.

Thus, in processing image data retouching, instead of executing it on the basis of a prescribed attribute of image data, an attribute specified by the image data attribute specifying unit is selected, and the processing by the picture element characteristic determining unit and the image data retouching unit is executed on the basis of this selection.

Thus, the attribute of image data to base the execution of image data retouching on is determined in accordance with a prescribed specification, not only resulting in greater convenience of use but also making it possible to obtain an output satisfying the user's requirement.

It is sufficient for the image data attribute specifying unit here to be able to specify the attribute on the basis of which image data are to be handled, and this attribute may be selected by the user or may be an attribute suitable for the composition of image data, identified by analysis of the image data. Or an attribute matching the state of the hardware resource to be applied may be specified. Of course, the choice of attribute is not limited to these, but if an attribute on the basis of which the image data retouching unit retouches image data can be specified, it can be altered as appropriate.

It can be any attribute that can be derived from picture elements expressed in multiple tones, which constitute image data. The applicable data may be binary data, RGB data, or luminance data computed from the RGB data. Of course, the choice of attribute is not limited to these, but if the attribute can express the state of image data, it can be altered as appropriate.

As an example of attribute to be specified, according to Claim 12 of the invention, in the image data retouching apparatus according to Claim 11, the image data attribute specifying unit has a configuration to specify luminance signals as the attribute where high-speed image data retouching is desired and to specify an element color signal constituting images as the attribute where high-quality image data retouching is desired.

In the above-described configuration according to Claim 12, the image data attribute specifying unit, when specifying the attribute of image data to be retouched, specifies luminance signals as the attribute where high-speed processing is desired. Or where the quality of image data to be generated after image data retouching is required to be high, it specifies element color signals as the attribute, for instance RGB signals.

Where the image data consist of RGB data, luminance signals can be computed on the basis of these RGB data. If the number of picture elements constituting the image data is 100, since only one tone can be computed for each picture element on the basis of a luminance signal, there will be image data comprising 100 luminance tones. On the other hand, if RGB data are used, as each picture element has three colors, there will be image data comprising 300 tones. Accordingly, there will be a difference in the number of data to undergo image data retouching, luminance signals will be specified where high-speed image data retouching is desired. Or where high-quality output is to be realized, element color signals constituting images, such as RGB signals will be specified as the attribute.

This is due to the following reason. Usual luminance signals are not a mixture of RGB signals in equal proportions, but a mixture of 30% of R signals, 60% of G signals and 10% of B signals, all approximately. For this reason, if for instance B data have a large moiré content, the moiré content of the B data cannot be sufficiently reduced by retouching luminance signals and causing that retouching to be reflected in RGB signals. In order to sufficiently reduce the moiré content of the B data then, each of the RGB data should be retouched. Therefore, if a high-quality output is desired, RGB signals are specified.

Incidentally, the image data retouching accomplished by the image data retouching unit may be any processing that retouches image data and thereby adjusts the quality of reproduced images. Therefore, it may be chosen out of appropriate alternatives including the sharpening and unsharpening of images. In such image data retouching, a prescribed filter is often applied to each picture element. If it is desired to sharpen prescribed picture elements, a prescribed sharpening filter is applied to those picture elements to emphasize tones, or if it is desired to unsharpen prescribed picture elements, a prescribed smoothing filter is applied to uniform tones.

It can be readily understood that this technique to determine the characteristic of each of picture elements constituting image data and retouching the picture elements according to their respective characteristics is not necessarily confined to a substantive apparatus, but can also function as a method for such processing. In this connection, according to Claim 13 of the invention, there is provided an image data retouching method for determining the characteristic of each picture element in image data which express images in a dot matrix form in multiple tones and retouching each picture element in a way appropriate to its characteristic, the method comprising: an image data acquisition step to acquire the image data; a picture element characteristic determining step to figure out the distribution of differences of tone levels between object picture elements, which are the picture elements of the image data acquired by the image data acquisition step, and neighboring picture elements in a prescribed range around the object picture elements, and determining the characteristic of each object picture element by comparing the distribution so figured out and a prescribed model distribution; and an image data retouching step to execute prescribed image processing according to the characteristics of picture elements determined by the picture element characteristic determining step.

Thus it is certain that the technique is not necessarily confined to a substantive medium or the like, but also can be effective as a method. It goes without saying that the modes of carrying out the invention as disclosed in Claims 1 through 12 can be applied to this image data retouching method in exactly the same way.

Incidentally, the idea underlying the invention may be realized in many different modes of implementation. It may be either embodied in such an image data retouching apparatus by itself or used in a state of being built into some other hardware. It is therefore alternatively substantiated as software or hardware as appropriate.

Where the idea underlying the invention is to be substantiated as software for an image data retouching apparatus, it can obviously be present on a recording medium on which the software is recorded and utilized as such.

As an example of such alternative, according to one embodiment of the invention, there is provided a medium on which is recorded an image data retouching program for determining the characteristic of each picture element in image data which express images in a dot matrix form in multiple tones and retouching each picture element in a way appropriate to its characteristic, the program comprising: an image data acquisition function to acquire the image data; a picture element characteristic determining function to figure out the distribution of differences of tone levels between object picture elements, which are the picture elements of the image data acquired by the image data acquisition function, and neighboring picture elements in a prescribed range around the object picture elements, and determining the characteristic of each object picture element by comparing the distribution so figured out and a prescribed model distribution; and an image data retouching function to execute prescribed image processing according to the characteristics of picture elements determined by the picture element characteristic determining function. It goes without saying that the modes of carrying out the invention as disclosed in Claims 1 through 12 can be applied in exactly the same way to this medium on which the image data retouching program is recorded.

Of course, such a recording medium may be a magnetic recording medium, an opto-magnetic recording medium or any other suitable recording medium that may be developed in the future. Exactly the same applies to any stage of copying, be it a primary copy or a secondary copy, with no room for doubt.

Further, even where the invention is realized with software in part and with hardware in part, there is no difference whatsoever in the underlying idea. Or else, part of the program may be stored on a recording medium and read as required.

Where the invention is to be realized with software, it can either take a configuration utilizing hardware and/or operating system, or can be realized separately from them. For instance, inputting of image data for interpolation can be achieved by causing an operating system to call a prescribed function or by inputting such data from hardware without calling such a function. Where the invention is to be realized with the intervention of an operating system actually, in the process in which the program is recorded on a medium and circulated, it can be understood that the invention can be carried out with this program alone. Or, whereas what executes the program is a computer, the concept of computer here covers not only usual computers but may be anything else only if it is mounted with one or more CPUs and processes a program. For instance, obviously an intelligent printer or copying machine can be regarded as a computer in this sense.

Further, where the invention is to be carried out with software, the invention is not only realized by a recording medium on which the pertinent program is recorded, but it is obvious for the invention to be realized as the program as such, and the program itself also is included in the coverage of the invention.

BRIEF DESCRIPTION OF THE DRAWINGS

FIGS. 15A–15B illustrate another example of storage of picture element characteristics.

FIGS. 16A–16C illustrate a specific example of edge picture element.

FIGS. 17A–17C illustrate a specific example of moiré picture element.

FIGS. 18A–18C illustrate a specific example of intermediate picture element.

BEST MODE FOR CARRYING OUT THE INVENTION

Preferred embodiments of the present invention will be described with reference to the accompanying drawings.

Figure 1:
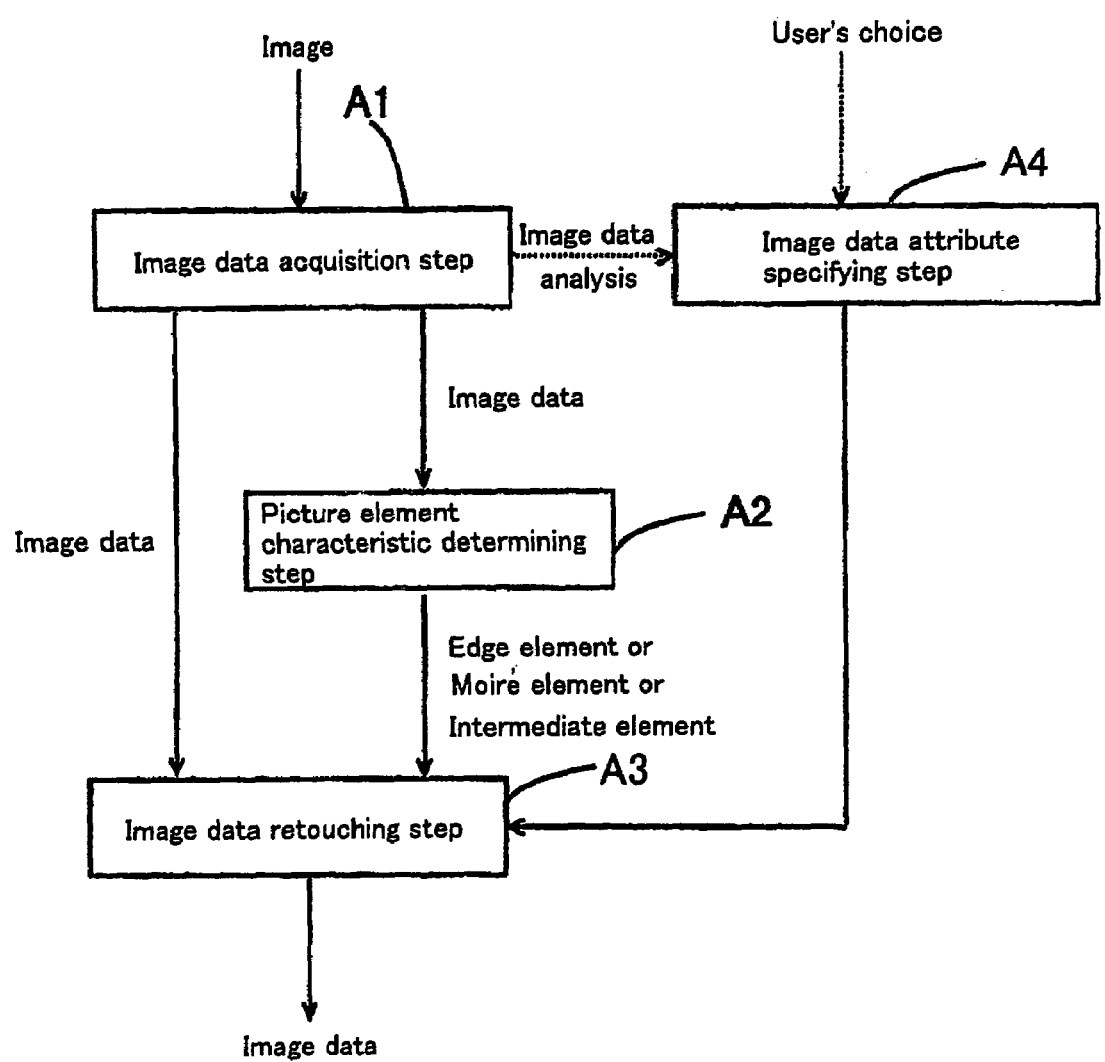
FIG. 1 illustrates an image data retouching method in a preferred mode of carrying out the present invention with reference to claims.

FIG. 1 illustrates an image data retouching method in a preferred mode of carrying out the invention with reference to claims.

Referring to FIG. 1, a medium on which this image data retouching program is recorded acquires at an image data acquisition step A1 image data which express images in a dot matrix form in multiple tones and at a picture element characteristic determining step A2 enters image data from the image data acquisition step A1 to analyze the data of the picture elements constituting the image data and to determine the characteristic of each picture element, i.e. whether it is an edge picture element, a moiré picture element or an intermediate picture element. More specifically, first, with respect to object picture elements to be determined, differences of tone levels between those picture elements and surrounding picture elements in a prescribed range are computed as vector values and then, on the basis of the distribution of these vector values, the total number of picture elements whose vector values and that of picture elements whose vector values are smaller are compared. The picture elements among which picture elements with greater vector values are relatively dominant are determined to be edgy picture elements, and those among with picture elements with smaller vector values are relatively dominant are determined to be moiré picture elements.

Further, picture elements among with picture elements which have smaller vector values but cannot be determined to be moiré picture elements are relatively dominant are determined to be intermediate picture elements. At the picture element characteristic determining step A2, all the picture elements are sequentially scanned to execute this determination procedure. When every picture element has gone through determination as to whether it is an edge picture element, a moiré picture element or an intermediate picture element, at an image data retouching step A3, with respect to image data entered from the image data acquisition step A1, prescribed smoothing is executed on picture elements which were determined as constituting edge picture elements, while prescribed smoothing is executed on picture elements which were determined as constituting moiré picture elements. What were determined as constituting intermediate picture elements are subjected no processing at all. At the image data retouching step A3, as at the picture element characteristic determining step A2, all the picture elements are sequentially scanned to execute image data retouching.

In carrying out such image data retouching, at an image data attribute specifying step AL1 the attribute to be handled in the image data retouching, such as luminance signals or RGB signals, are specified. This may be specified either by the user or as dictated by the composition of image data. Therefore, if luminance signals are specified as the attribute, at the image data retouching step A3 image data retouching is executed according to the luminance data of each picture element or, if RGB signals are specified as the attribute, image data retouching is executed according to the RGB data of each picture element.

Figure 2:
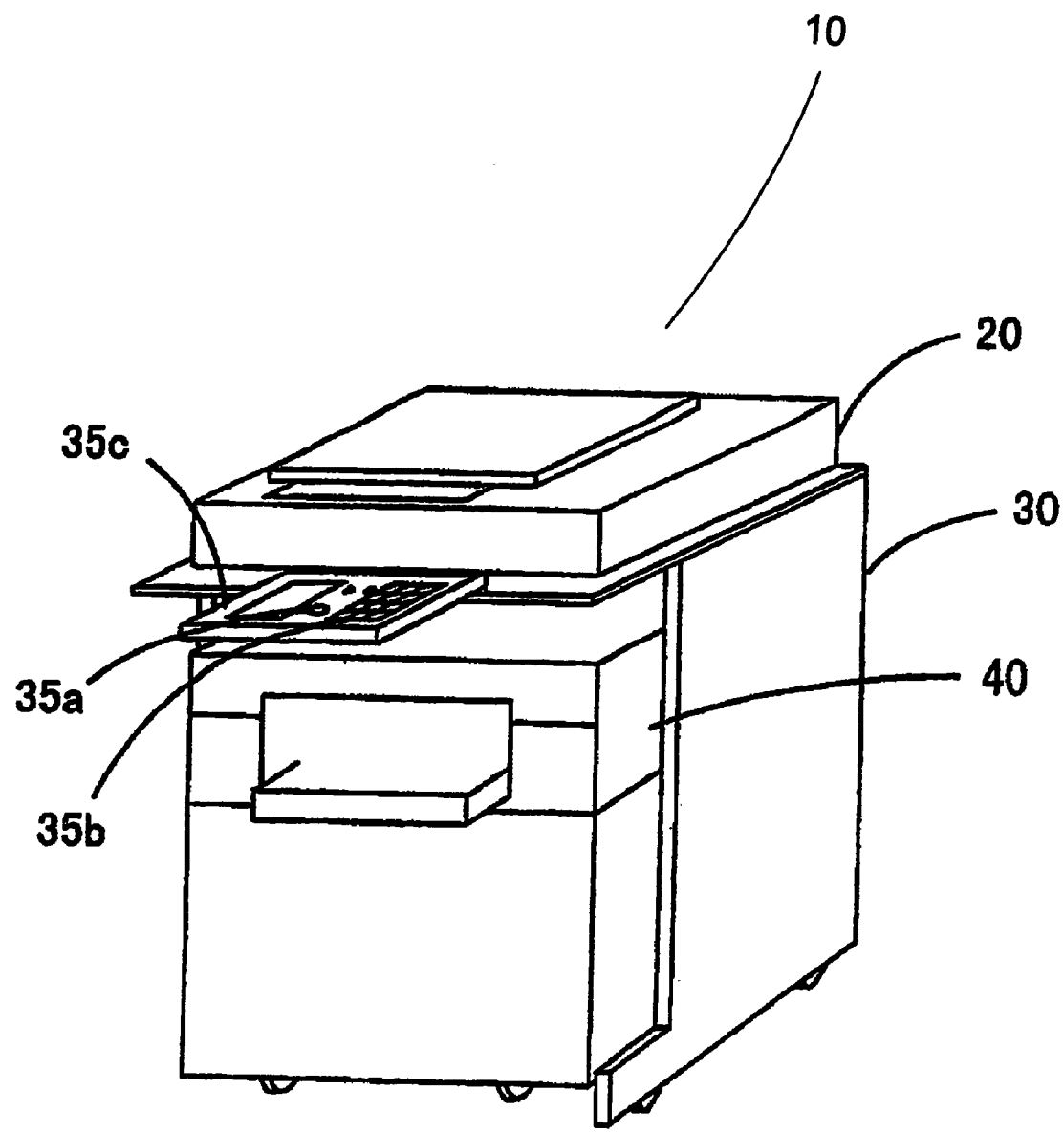
FIG. 2 schematically illustrates the appearance of a color copying machine to which this image data retouching method is applied for its substantiation.

Next, an external perspective view of a color copying machine to which this image data retouching method is applied for its substantiation is shown in FIG. 2.

This color copying machine 10 consists of a color scanner 20, a copy server 30 and a color printer 40. As the color scanner 20 scans an image under the control of the copy server 30, the copy server 30 processes the image data read in by the scanning to generate print data and the color printer 40 performs printing on the basis of these print data.

Figure 3:
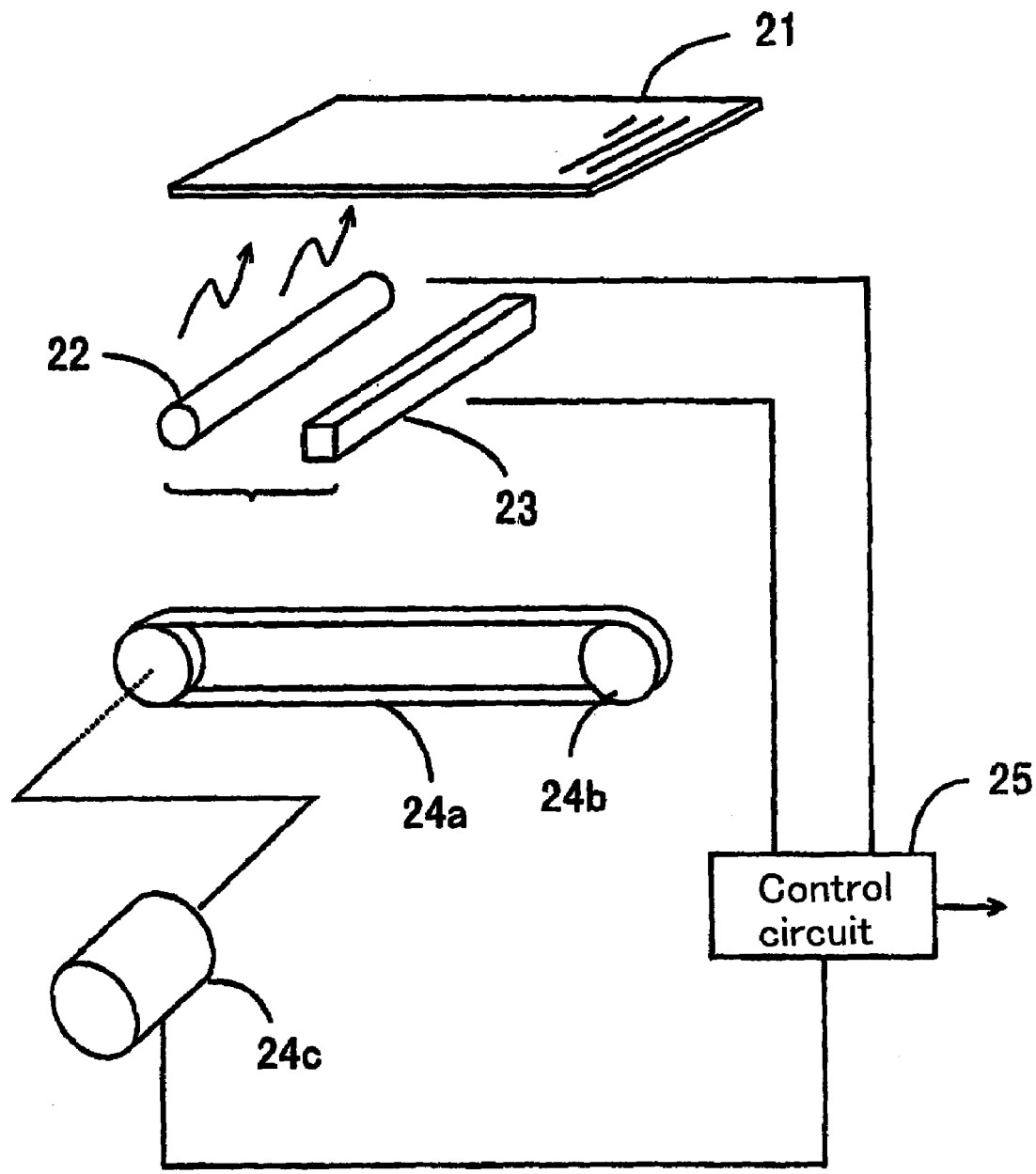
FIG. 3 schematically illustrates the configuration of the scanner of this color copying machine.

FIG. 3 schematically illustrates the configuration of the color scanner 20, which is a flat head type unit in this embodiment of the invention.

Referring to the figure, underneath a transparent plate 21 on which the object of scanning is to be mounted there are supported an illumination lamp 22 and a line sensor 23 in a reciprocative sliding, and a drive belt 24a, pulleys 24b and a drive motor 24c for driving them are arranged, all connected to a control circuit 25. When reading an image in, the illumination lamp 22 is turned on in accordance with a control signal from the control circuit 25 and, as it illuminates the object of scanning via the transparent plate 21, light reflected from the object of scanning irradiates the line sensor 23 via the transparent plate 21.

In the line sensor 23 here, one row of an RGB filter and a CCD element for each of three primary colors of light, or a total of three rows are usually arranged, and these three rows of CCD elements read in the color arrangement for one row of the object of scanning in the horizontal direction and output them as image data. On the other hand, the control circuit 25 moves these illumination lamp 22 and line sensor 23 integrally in the vertical direction of the object of scanning by driving the drive motor 24c; every time it moves them by a minute distance, acquires image data from the line sensor 23 and outputs them. This, while subjecting externally the object of scanning to main scanning in the horizontal direction, subjects it to subscanning in the vertical direction to generate two-dimensional image data.

Figure 4:
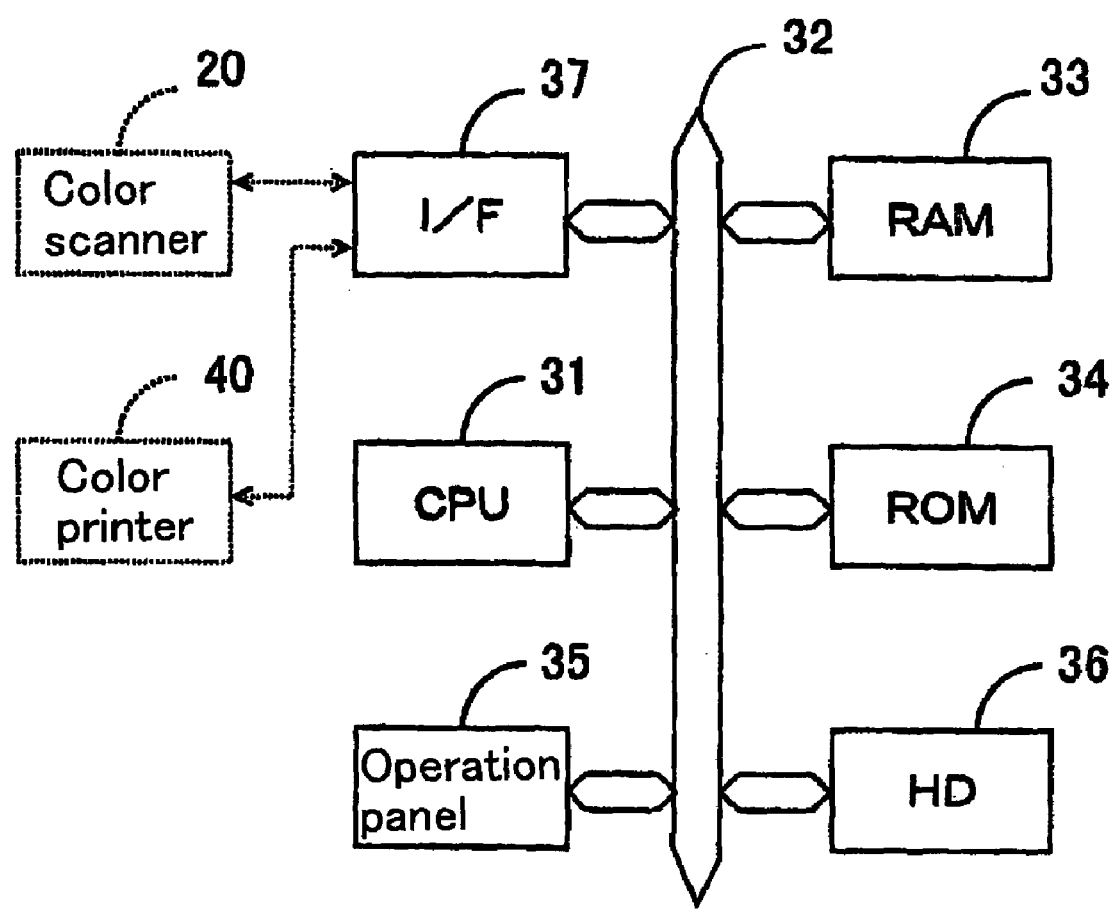
FIG. 4 is a schematic block diagram illustrating the configuration of the server of this color copying machine.
Figure 5:
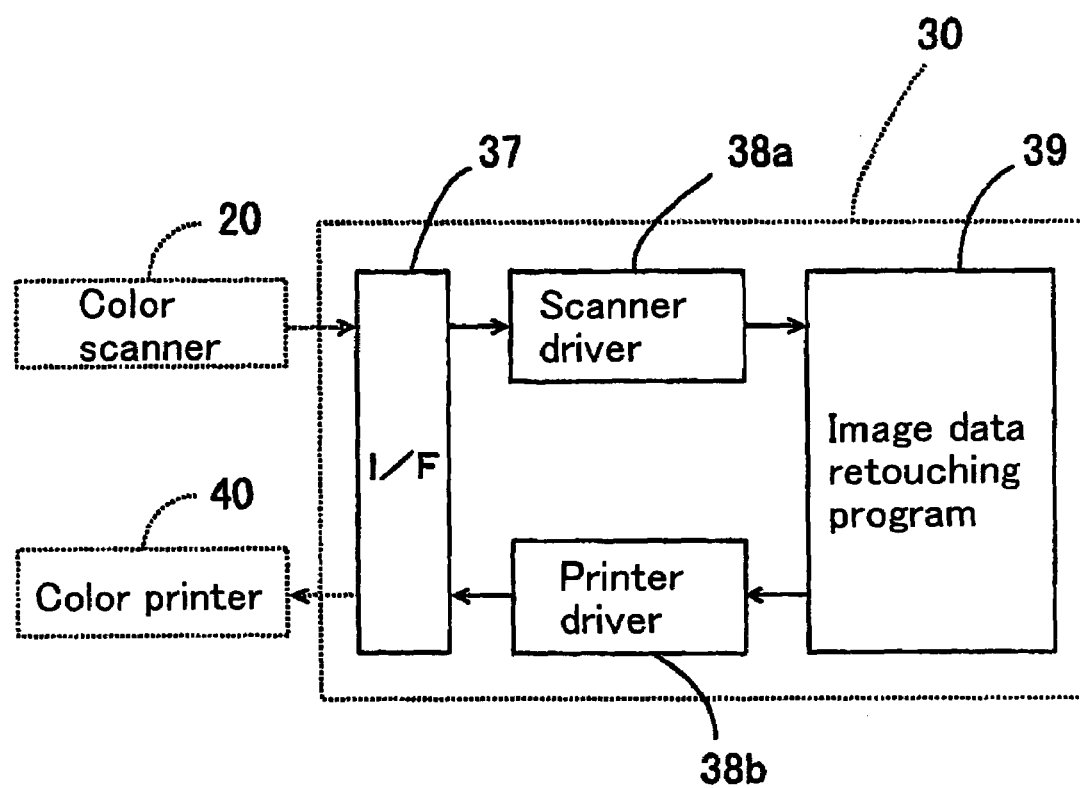
FIG. 5 is a schematic block diagram illustrating the configuration of this server.

FIGS. 4 and 5 are schematic diagrams illustrating the copy server 30. The copy server 30, schematically equivalent to a computer, has a configuration in which a RAM 33, a ROM 34, an operation panel 35, a hard disk 36 and an I/F 37 are connected to the bus 32 of a CPU 31.

Here the color scanner 20 and the color printer 40 are connected via the I/F 37. In the ROM 34 are written a basic arithmetic program and a conversion table, and the CPU 31, while using the RAM 33 as its work area, executes the arithmetic program, and references the conversion table as required. Although nothing particular is specified for the I/F 37 in this mode of carrying out the invention, it is sufficient for the I/F 37 to be able to connect the color scanner 20 and the color printer 40 to the copy server 30. It may be connected by an LPT port or by a USB port or SCSI.

The hard disk 36 is provided with a scanner driver 38a for driving the color scanner 20 and a printer driver 38b for driving the color printer 40. The scanner driver 38a can input image data from the color scanner 20, and the printer driver 38b can output image data to the color printer 40.

The hard disk 36 is also used as a buffer for temporarily storing these image data, stores an image data retouching program 39 for reading in image data entered by the scanner driver 38a, determining the characteristics of the picture elements constituting the image data, carrying out prescribed image data retouching in accordance with this determination, outputting the retouched image data to the printer driver 38b and causing the color printer 40 to execute printing.

In addition to these, the operation panel 35 is provided with various operation buttons including a scan start button 35a, a ten key block 35b for entering the number of copies to be printed, setting the items of image retouching, and setting the type of the object of scanning, whether it is a color image containing a photograph or the like or a monochrome image such as a document, a liquid crystal display 35c for confirming operational information. The CPU 31 can monitor the operation from the operation panel 35 via the bus 32.

Figure 6:
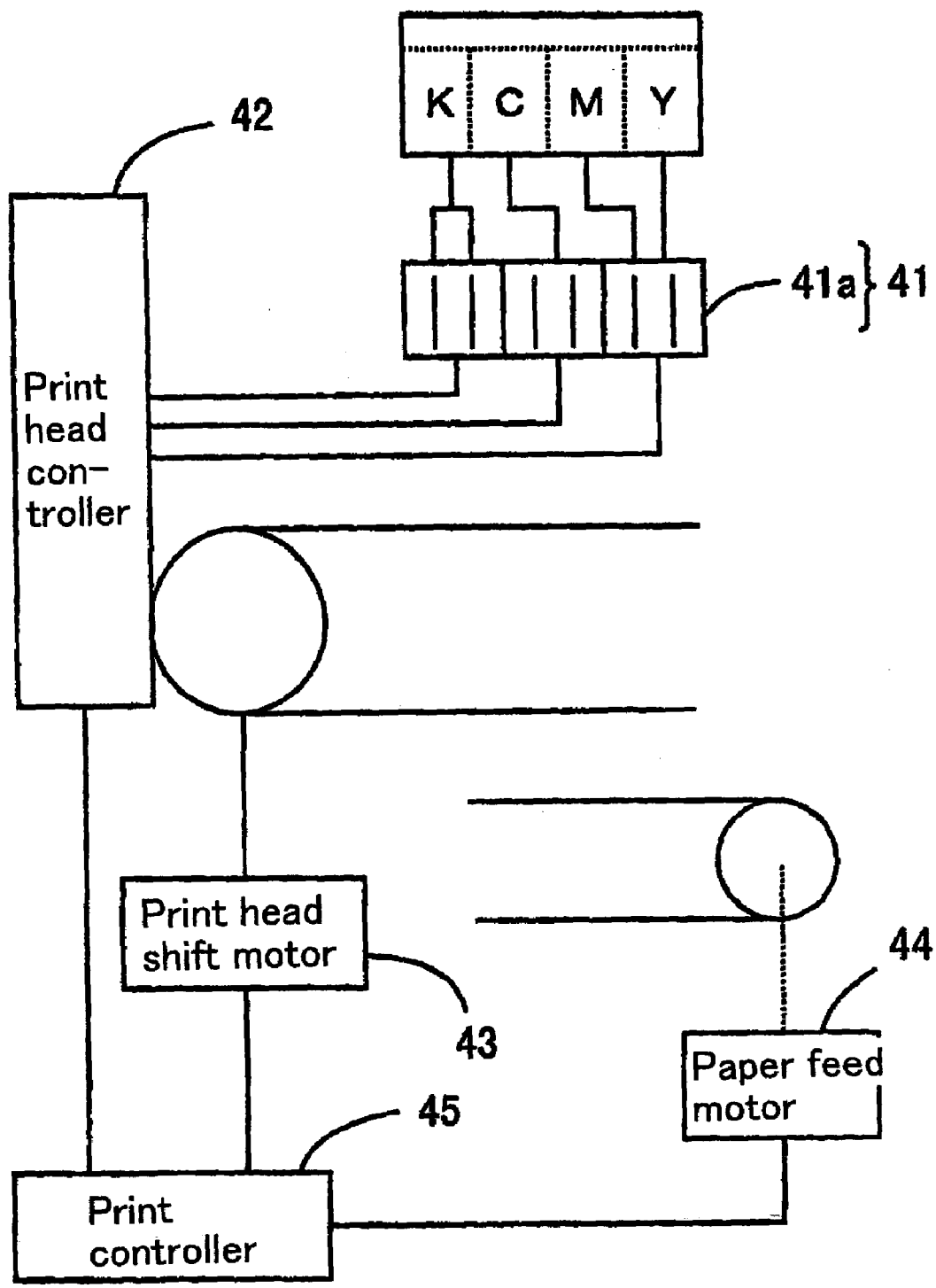
FIG. 6 schematically illustrates the configuration of the color printer of this color copying machine.

FIG. 6 schematically illustrates the configuration of the color printer 40, which uses an ink jet system by which printing is accomplished by ejecting color inks in a dot matrix form onto recording paper. In more detail, it is configured of a print head 41 consisting of three print head units 41a, a print head controller 42 for controlling this print head 41, a print head shift motor 43 for moving the print head 41 in the column direction, a paper feed motor 44 for feeding the printing paper in the line direction, and a printer controller 45 serving as the interface for these print head controller 42, print head shift motor 43 and paper feed motor 44 with external devices.

This color printer 40 uses inks of four colors for printing, and each of its print head unit 41a is provided with two mutually independent rows of print nozzles. The color ink to be fed can be altered for each row of print nozzles. In the illustrated case, both rows of the print head unit 41a to the left of the drawing are supplied with black ink (K), the left row of the print head unit 41a to the right of the drawing is supplied with magenta color ink (M), the right row of the same with yellow ink (Y), the left row of the print head unit 41a in the middle with cyanic ink (C), and the right row of the same is not used.

Figure 7:
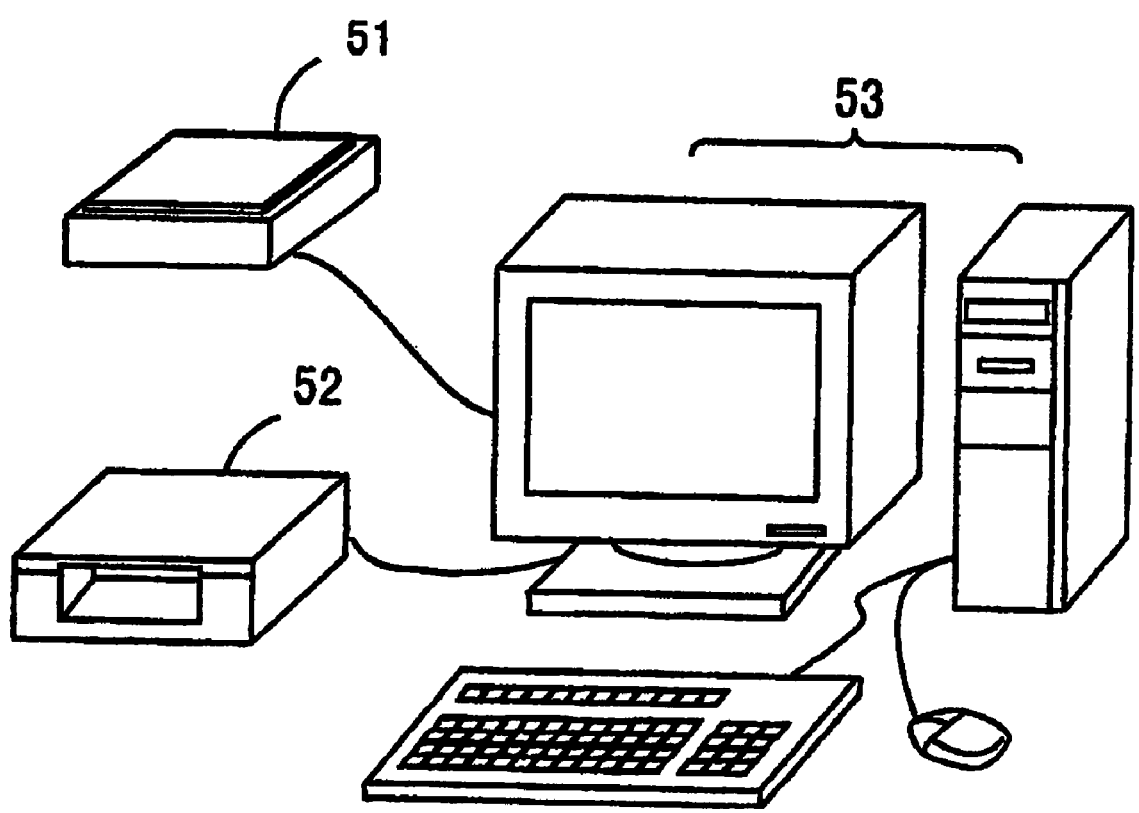
FIG. 7 schematically illustrates the appearance of a computer system representing a variation of this color copying machine.

Incidentally, although inks of four colors are used in this embodiment, it is also possible to use inks of six colors by maximal utilization of the two rows of print nozzles in each of the three print head units 41a. In this case, dark-colored and light-colored inks are used for cyanic and magenta colors, and yellow and black inks are added to them to use altogether six colors. Although in this mode of implementing the invention, this image data retouching apparatus is applied to a dedicated color copying machine 10 formed in an integrated manner having the copy server 30 as its core, needless to mention it is also possible to realize a color copying system with a personal computer 53 provided with a color scanner 51 and a color printer 52 as illustrated in FIG. 7.

Figure 8:
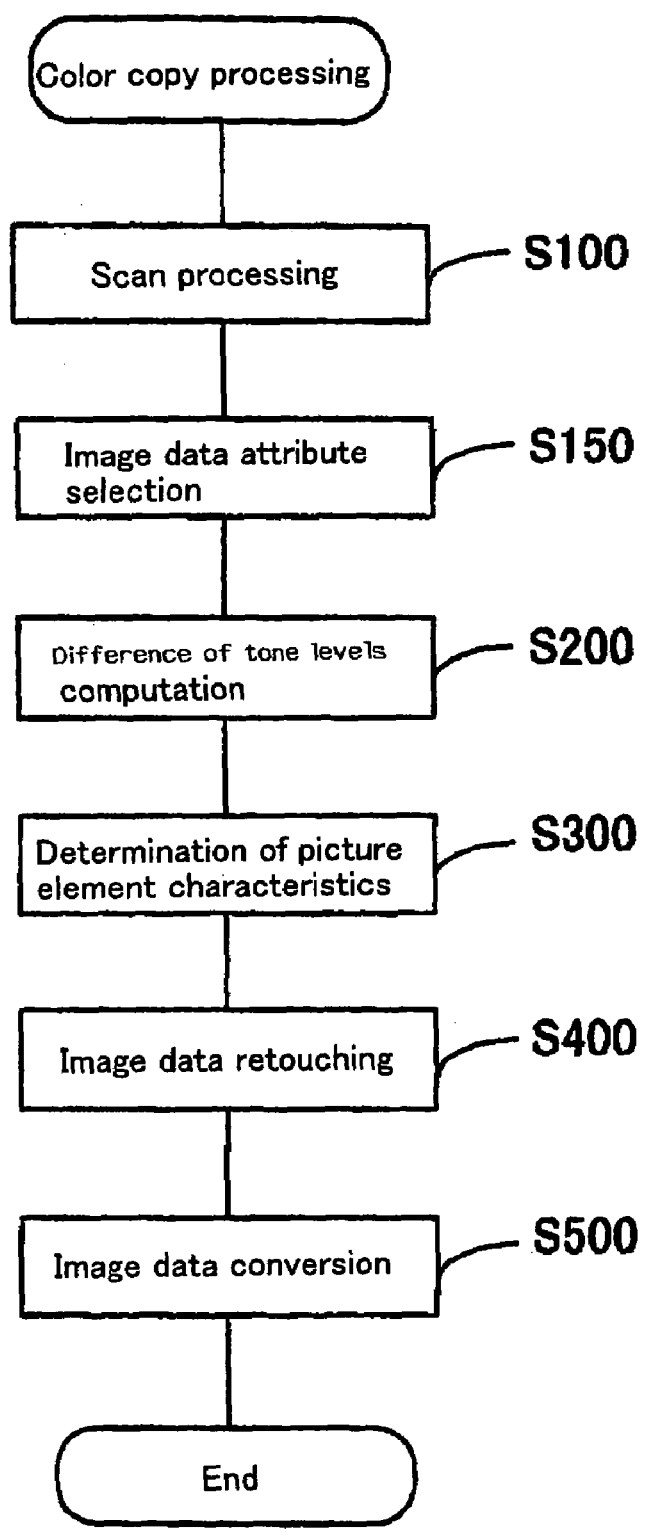
FIG. 8 is a flowchart schematically showing the color copying executed by the copy server.

FIG. 8 is a flowchart showing some details of, out of possible procedures if color copying executed by the aforementioned copy server 30, image data retouching according to the present invention.

Referring to the chart scanning, the operator of the color copying machine 10, after placing the object of scanning on a flat bed 21 of the color scanner 20, presses down the scan start button 35a on the operation panel 35. This causes the color scanner 20 to start scanning in accordance with the above-described operational procedure. First, in order to generate image data consisting of picture elements of a prescribed resolution for the overall image of the flat bed 21 including the object of scanning, the color scanner 20 executes scanning (step S100). Then, in retouching the generated image data, it executes image data attribute selection to select the attribute of the image data to be retouched (step S150). Then, using the picture elements of the generated image data as the object picture elements, it executes difference of tone levels computation on the basis of the selected attribute to compute differences of tone levels of the object picture elements from surrounding picture elements (step S200), and executes picture element characteristic determination on the basis of these differences of tone levels to determine whether each picture element is an edge picture element, a moiré picture element or an intermediate picture element (step S300). Next, the color scanner 20 executes image data retouching to sharpen the picture element if it is an edge picture element, smoothes the picture element if it is a moiré picture element, or holds the original data of the picture element if it is an intermediate picture element (step S400). This image data retouching is also executed on the basis of the selected attribute. Upon completion of this image data retouching, the color scanner 20 executes image data conversion to generate print data to be fed to the color printer 40 (step S500), and the print data converted from the image data are transferred to the color printer 40, and printed out by this color printer 40. Thus, since the attribute of the image data to be retouched are selectable, if for instance image data retouching is desired to be executed quickly, luminance signals can be selected as the attribute, or if high picture quality is desired for the result of image data retouching, RGB signals can be selected as the attribute, resulting in a desired image data retouching environment in either case.

Next each of the processing steps S100 through S500 will be described in more specific detail with reference to the flowcharts of FIGS. 9 through 11, 13, 19 and 22.

Figure 9:
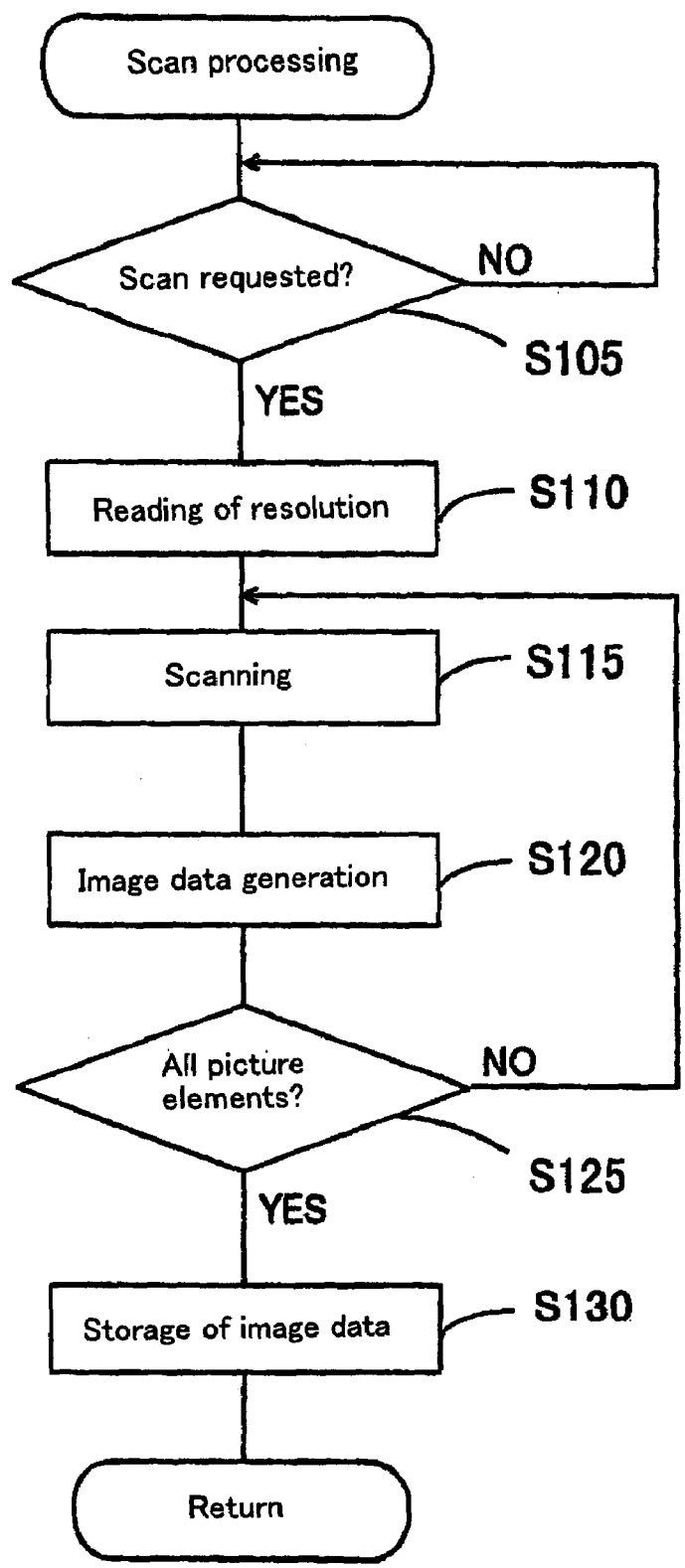
FIG. 9 is a flowchart schematically showing the scanning executed by the copy server.

The flowchart of FIG. 9 shows scanning at step S100.

As stated above, when the operator of this color copying machine places a document on the flat bed 21 as the object of scanning and presses down the scan start button 35a, an image reading instruction is issued to the color scanner 20 via the I/F 37 to start scanning (step S105). Then, the resolution of scanning either set by the operation with the ten key block 35b or preset in this color copying machine 10 is read out (step S110). Hereupon, the control circuit 25 of the color scanner 20 turns on the illumination lamp 22, and starts image scanning by giving a drive instruction to the drive motor 24c to cause the illumination lamp 22 and the line sensor 23 to slide (step S115). Then the control circuit 25, every time a prescribed distance is traveled, acquires image data read by the line sensor 23, at the same time generates image data which will take on a pre-designated resolution (step S120), and transmits them to the copy server 30. On the part of the copy server 30, these image data are received via the I/F 37, and spooled on the hard disk 36. Here, when it is determined the scanning of the picture elements divided as described above has been wholly completed (step S125), the spooled image data are stored onto the hard disk 36 (step S130). Thus, the processing to scan the object of scanning at a prescribed resolution and to stored the image data as they are acquired constitutes the image data acquisition step A1 according to the invention.

Figure 10:
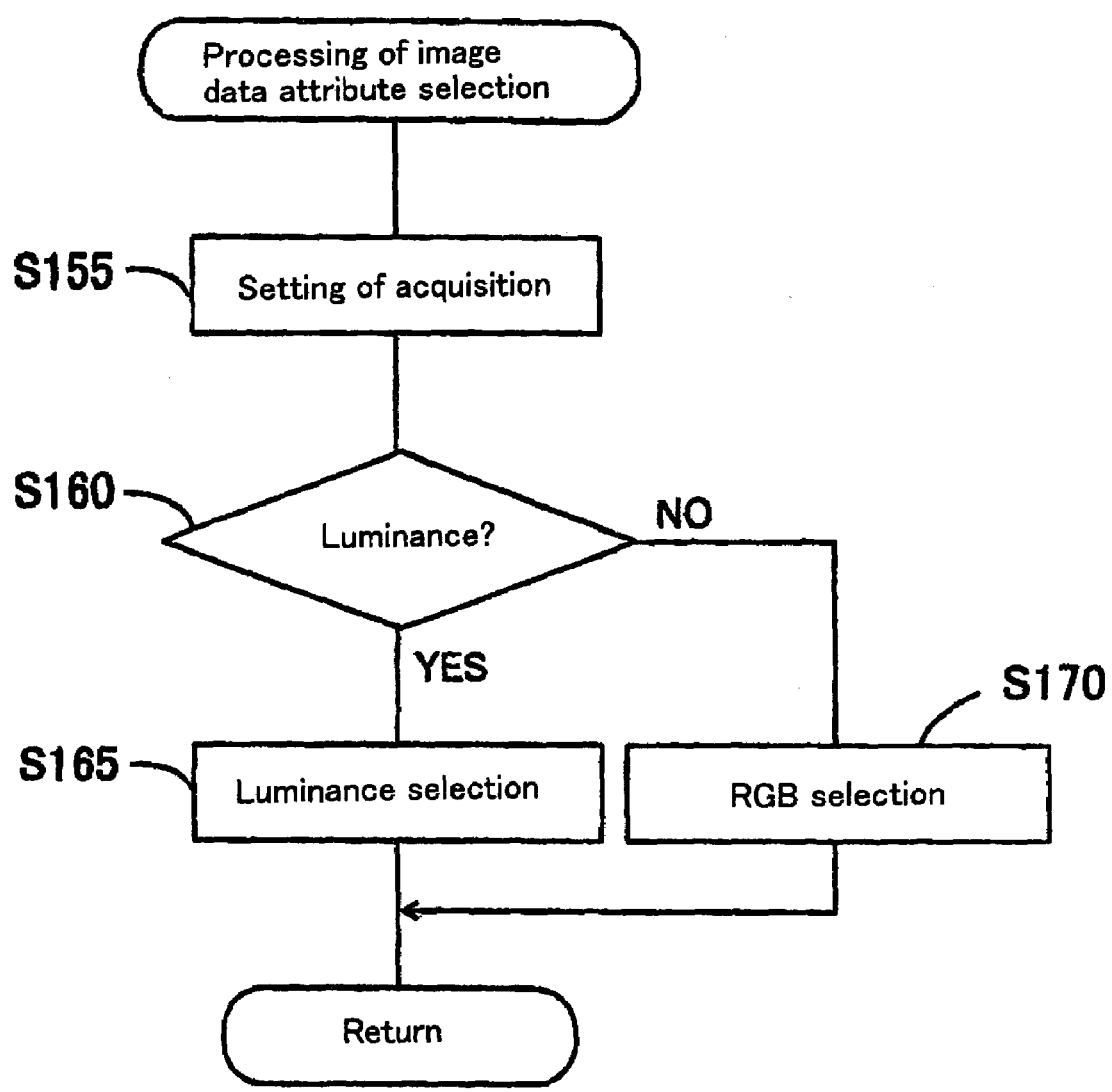
FIG. 10 is a flowchart schematically showing the image data attribute selection executed by the copy server.

In this manner, the color scanner 20 generates the image data of the object to be scanned. These image data are subjected to various modes of retouching with a view to improving the picture quality or some other purpose. When carrying out such image data retouching, the image data should be handled in accordance with a prescribed attribute. FIG. 10 is a flowchart showing how the image data attribute selection at step S150 to select this attribute is processed.

Referring to the chart, the attribute set by the user on the operation panel 35 of the copy server 30 is acquired (step S155). If this attribute is luminance (step S160), it is so set that, when image data are to be handled thereafter, prescribed processing be executed on luminance data (step S165). On the hand, if the acquired attribute is RGB, it is so set that, when image data are to be handled thereafter, prescribed processing be executed on RGB data (step S170).

Figure 11:
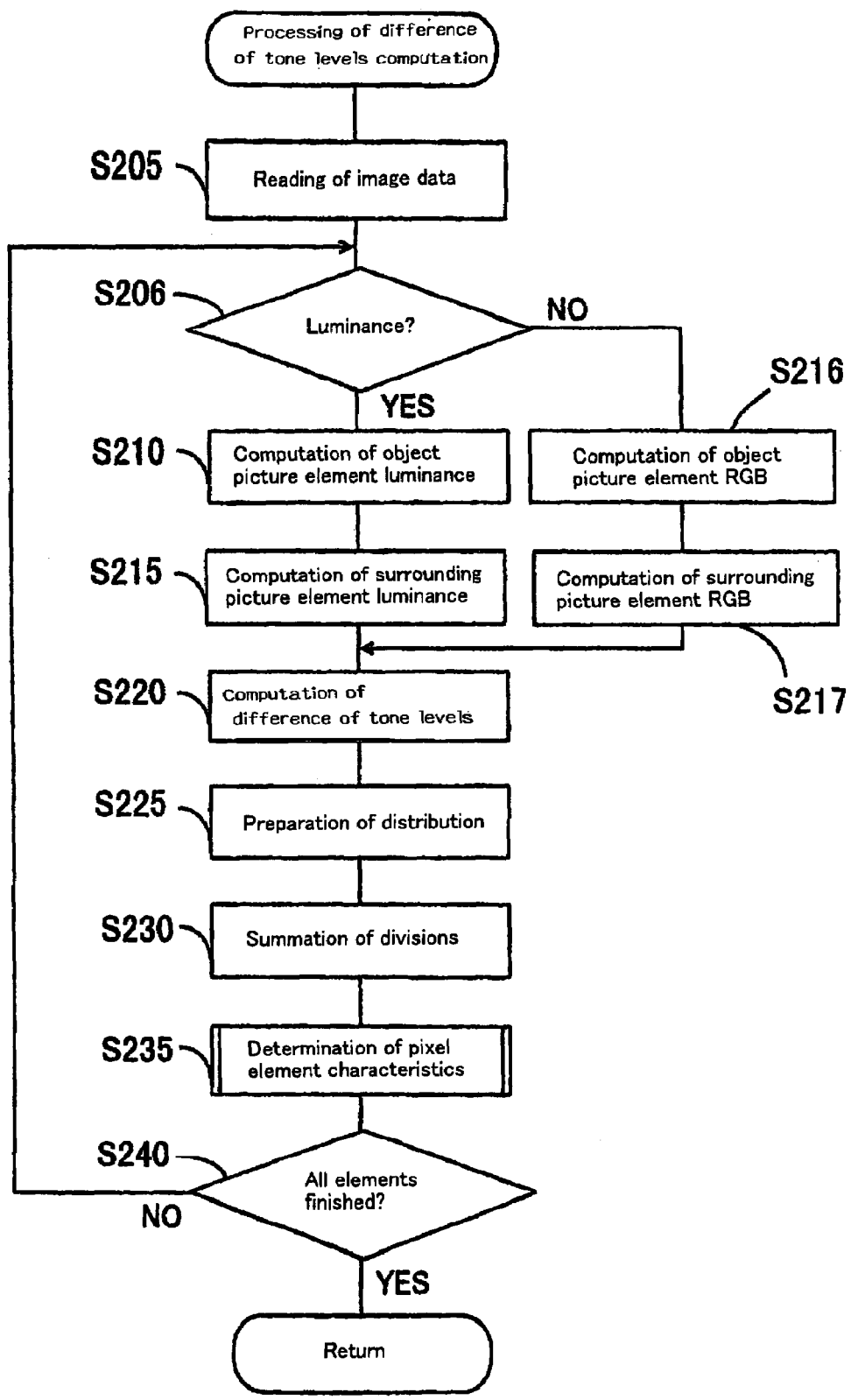
FIG. 11 is a flowchart schematically showing the difference of tone levels computation executed by the copy server.

FIG. 11 is a flowchart showing how the difference of tone levels computation at step S200 is processed.

Referring to the chart, image data on the image, which is the object of scanning generated by scanning are read out (step S205), and it is determined by the above-described image data attribute selection whether or not the selected attribute is luminance data (step S206). If it is luminance data, each of the picture elements constituting the image data is scanned and, while the scanned picture elements are made the object picture elements according to which the attribute of these picture elements is to be determined, the luminance of these object picture elements is computed (step S210). This luminance Y is computed by substituting the tones of the data on the element colors R, G and B, constituting the object picture elements, into the following Equation (1):

$$Y = 0.30R + 0.59G + 0.11B \qquad (1)$$

Next, the luminance of the picture elements surrounding these object picture elements, the surrounding picture elements being formed in a 5*5 matrix form, is computed on the basis of Equation (1) (step S215).

On the other hand, where the selected attribute is RGB data, the RGB data on each of the object picture elements are extracted (step S216), and at the same time the RGB data on each of the surrounding picture elements are extracted (step S217).

Where the attribute is luminance data, the luminance tones of the object picture elements are subtracted from the luminance tones of the surrounding picture elements are subtracted to compute the differences of tone levels. On the other hand, where the attribute is RGB data, for each of the R, G and B data the tones of the object picture elements are subtracted from the tones of the surrounding picture elements to compute the differences of tone levels (step S220). Upon completion of computation of the differences of tone levels from the surrounding picture elements, a distribution based on the frequency of picture elements contained in each of these differences of tone levels is prepared (step S225), and summation is done of each of the divisions determined to be edge picture elements, moiré picture elements and intermediate picture elements (step S230).

By executing the picture element characteristic determination to be described later on, it is determined whether the object picture elements are edge picture elements, moiré picture elements or intermediate picture elements (step S235). It is determined whether or not determination of the characteristic of picture elements as the object picture elements by picture element characteristic determination has been executed on all the picture elements of image data read out at step S205 (step S240). If characteristic determination has been completed on all the picture elements, difference of tone levels computation is ended or, if characteristic determination has not been completed on all the picture elements, the object picture elements are shifted, and the processing from step S210 onward is repeated.

Figures 12A, 12B, 12C:
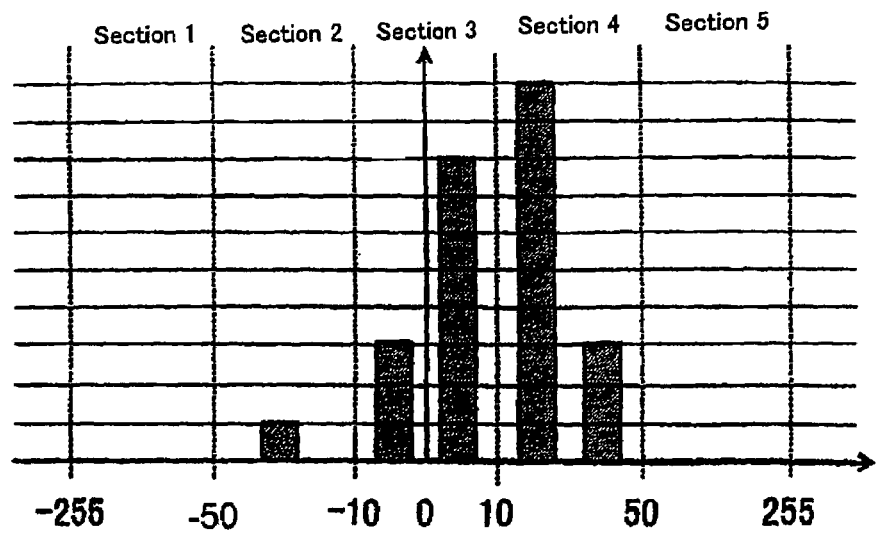
FIGS. 12A–12C illustrate the process of preparation a distribution from differences of tone levels in the difference of tone levels computation.

Hereupon, the above-described difference of tone levels computation will be explained in further specific detail with reference to FIG. 12. FIG. 12A illustrates original image data in a 5*5 matrix. Each small box represents a picture element. To position each picture element in (x, y) coordinates, the shaded picture element (0, 0) at the center constitutes an object picture element, and the picture element (−2, −2) through the picture element (2, 2) including this object picture element (0, 0) constitute the surrounding picture elements.

The numeral in the box of each picture element represents the tone of the element. By the following Equation (2), differences of tone levels between the object picture element and the surrounding picture elements are computed:

$$b(n1,n2)=a(n1,n2)-a(N1,N2) \quad (2)$$

n1=N1−2, N1−1, N1, N1+1, N1+2
n2=N2−2, N2−1, N2, N2+1, N2+2 where a(N1, N2) is the tone of the object picture element, which is a(N1, N2)=64 in this mode of implementation; a(n1, n2) is the original tones of the surrounding picture elements, and b(n1, n2), differences of tone levels between the surrounding picture elements and the object picture element. The result of this computation is shown in the 5*5 matrix of FIG. 12B. While preparing the distribution of these differences of tone levels, the distribution totaled for each section in FIG. 12C is generated.

Although in this mode of implementing the invention, these sections are supposed to be section 1 [−255, −50), section 2 [−50, −10), section 3 [−10, 10), section 4 [10, 50) and section 5 [50, 255], and the frequencies of differences of tone levels are totaled for these sections 1 through 5. In such a case, it is seen that, the respective totals being represented by C1 through C5, C1=0, C2=1, C3=11, C4=13 and C5=0.

Furthermore, although in this mode of implementation the sections of distribution are supposed to be section 1 [−255, −50), section 2 [−50, −10), section 3 [−10, 10), section 4 [10, 50) and section 5 [50, 255], of course the way of section setting is not confined to this, but can be altered as appropriate.

Processing at steps S225 through S235 is executed on a sole luminance datum for each picture element where the attribute is luminance data. On the other hand, where the attribute is RGB data, it is executed on the RGB data of each picture element.

Figure 13:
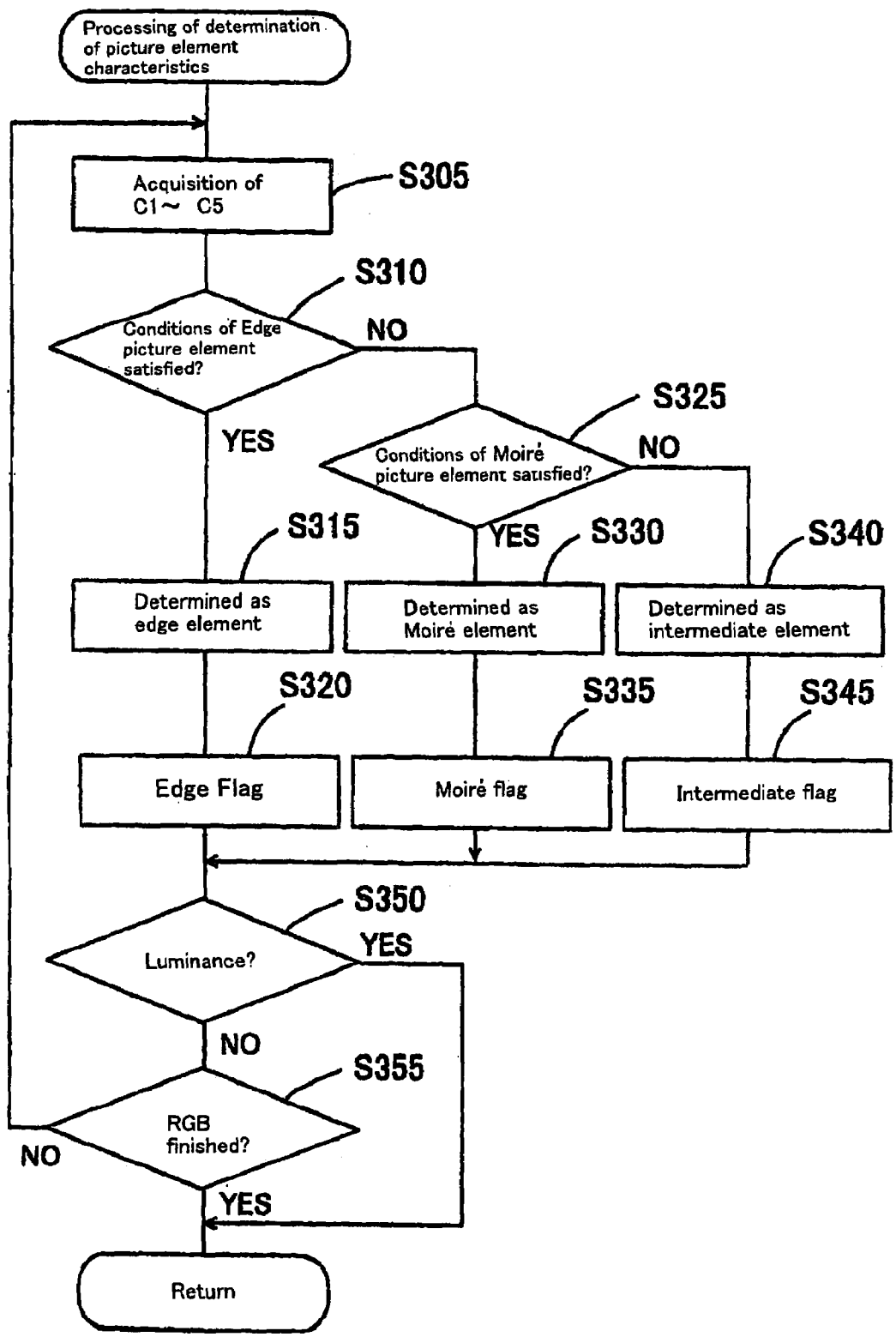
FIG. 13 is a flowchart schematically showing the picture element characteristic determination executed by the copy server.

Next will be described the picture element characteristic determination to be carried out at step S235 explained above. FIG. 13 is a flowchart showing how this picture element characteristic determination is processed.

Referring to the chart, first, C1 through C5 totaled for the object picture element are acquired (step S305). Then, it is determined whether not C1 through C5 satisfy the requirement for determination of an edge picture element represented by the following Equation (3) (step S310):

$$C1>C2>Te,C4=C5=0$$

or $$C5>C4>Te,C1=C2=0 \quad (3)$$

where Te is a predetermined threshold, Te=5 in this mode of implementation. Or course, Te is not confined to 5, but can be altered as appropriate.

If this Equation (3) is satisfied, the object picture element is determined to be an edge picture element (step S315), and a picture element characteristic flag indicating the characteristic of this picture element is supposed to be an edge flag (step S320).

Figure 14A:
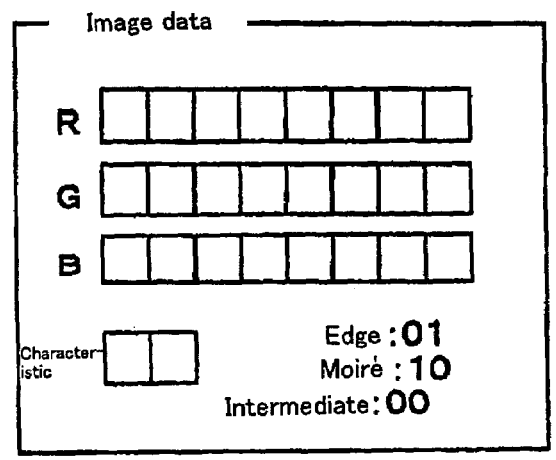
FIGS. 14A–14B illustrate an example of storage of picture element characteristics.
Figure 14B:
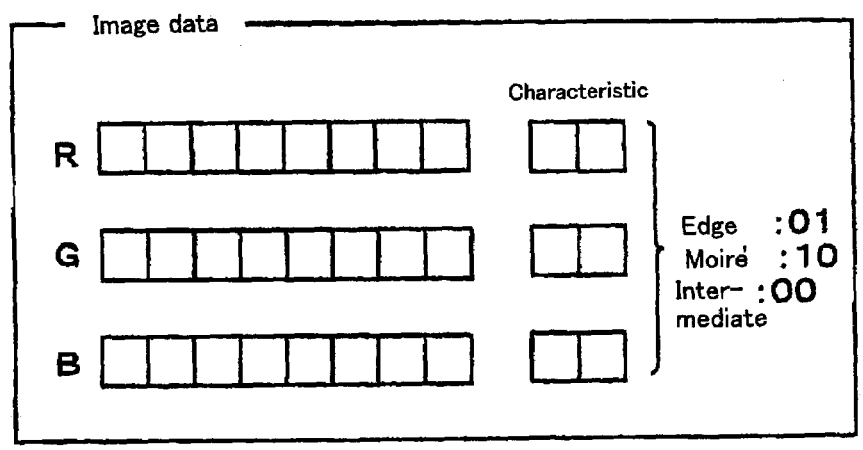

Since such an edge flag is the sole picture element characteristic flag for each picture element where the attribute is luminance data, it uses a configuration in which, as illustrated in FIG. 14A, the prescribed position of the bit datum representing the characteristic, provided for each object picture element, is turned on and off, and where the attribute is RGB data, as illustrated in FIG. 14B, the bit datum representing the characteristic, provided for the RGB data of each object picture element, is turned on or off.

As another example, a characteristic flag table manifesting the same configuration as the range of picture elements constituting the image data may be generated as shown in FIG. 15A, and data representing edge flags may be written into the respectively corresponding picture element positions. Of course, while FIG. 15A illustrates a case in which the attribute is luminance data, a characteristic flag table is generated for each of R, G and B as illustrated in FIG. 15B where the attribute is RGB data.

Or if at step S310 the object picture element fails to satisfy the requirement for determination of an edge picture element, it is determined whether or not the requirement for determination of a moiré picture element represented by the following Equation (4) is satisfied (step S325):

$$C2>C1>Tm,C4=C5=0$$

or $$C4>C5>Tm,C1=C2=0 \quad (4)$$

where Tm is a predetermined threshold, Tm=3 in this mode of implementation. Or course, Tm is not confined to 3, but can be altered as appropriate.

If this Equation (4) is satisfied, the object picture element is determined to be a moiré picture element (step S330) and a picture element characteristic flag indicating the characteristic of this picture element is supposed to be a moiré flag (step S335).

Such a moiré flag may either turn on or off the prescribed position of the bit datum representing the tone datum of the object picture element as shown in FIGS. 14A and 14B or FIGS. 15A and 15B referred to above, or generate a characteristic flag table manifesting the same configuration as the range of picture elements constituting the image data and write a datum representing the moiré flag in the corresponding picture element position.

On the other hand a picture element that fails to satisfy the requirement for determination of a moiré picture element in the determination at step S325 is determined to be an intermediate picture element (step S340), and a picture element characteristic flag indicating the characteristic of this picture element is supposed to be an intermediate flag (step S345). Such an intermediate flag, too, may either turn on or off the prescribed position of the bit datum representing the tone datum of the object picture element as shown in FIGS. 14A and 14B or FIGS. 15A and 15B referred to above, or generate a characteristic flag table manifesting the same configuration as the range of picture elements constituting the image data and write a datum representing the intermediate flag in the corresponding picture element position.

If the selected attribute here is RGB data, it is necessary to determine for each of R, G and B whether or not procedures at steps S305 through S345 have been executed (step S350, S355).

Hereupon, examples of configuration and distribution of edge picture elements, moiré picture elements and intermediate picture elements are shown in FIGS. 16 through 18. These FIGS. 16 through 18 illustrate cases in which the attribute is luminance data. Where the attribute is RGB data, a distribution is generated for each of R, G and B.

FIG. 16 illustrates a case in which object picture elements form edge picture elements. FIG. 16A shows original image data in a 5*5 matrix, in which each box represents a picture element. The shaded picture element (0, 0) constitutes an object picture element, and the picture element (−2, −2) through the picture element (2, 2) including this object picture element (0, 0) constitute the surrounding picture elements. The numeral in the box of each picture element represents the tone of the element. By Equation (2), differences of tone levels between the object picture element and the surrounding picture elements are computed. The result of this computation is shown in the 5*5 matrix of FIG. 16B. While preparing the distribution of these differences of tone levels, the distribution totaled for each section in FIG. 16C is generated. In such a case, it is seen that, the respective totals being represented by C1 through C5, C1=0, C2=0, C3=1, C4=7 and C5=17. As these satisfy the requirement of Equation (3) stated above, the object picture elements are determined to be edge picture elements.

Further, FIG. 17 illustrates a case in which object picture elements form moiré picture elements. FIG. 17A shows original image data in a 5*5 matrix, in which each box represents a picture element. The shaded picture element (0, 0) constitutes an object picture element, and the picture element (−2, −2) through the picture element (2, 2) including this object picture element (0, 0) constitute the surrounding picture elements. The numeral in the box of each picture element represents the tone of the element. By Equation (2), differences of tone levels between the object picture element and the surrounding picture elements are computed. The result of this computation is shown in the 5*5 matrix of FIG. 17B. While preparing the distribution of these differences of tone levels, the distribution totaled for each section in FIG. 17C is generated. In such a case, it is seen that, the respective totals being represented by C1 through C5, C1=0, C2=0, C3=5, C4=12 and C5=8. As these satisfy the requirement of Equation (4) stated above, the object picture elements are determined to be moiré picture elements.

FIG. 18 illustrates a case in which object picture elements form intermediate picture elements. FIG. 18A shows original image data in a 5*5 matrix, in which each box represents a picture element. The shaded picture element (0, 0) constitutes an object picture element, and the picture element (−2, −2) through the picture element (2, 2) including this object picture element (0, 0) constitute the surrounding picture elements. The numeral in the box of each picture element represents the tone of the element. By Equation (2), differences of tone levels between the object picture element and the surrounding picture elements are computed. The result of this computation is shown in the 5*5 matrix of FIG. 18B. While preparing the distribution of these differences of tone levels, the distribution totaled for each section in FIG. 18C is generated. In such a case, it is seen that, the respective totals being represented by C1 through C5, C1=0, C2=1, C3=21, C4=2 and C5=1. As these satisfy the requirement of neither Equation (3) nor (4) stated above, the object picture elements are determined to be intermediate picture elements.

Therefore, by selecting and specifying the attribute of data in retouching the image data of the object of scanning, generated by the scanning, the image data attribute selection constitutes the image data attribute specifying step A4. Further by determining from the distribution of differences of tone levels from the surrounding picture elements, with respect to each of the picture elements constituting the acquired image data, whether the object picture elements are edge picture elements, moiré picture elements or intermediate picture element, differences of tone levels computation and picture element determination constitutes the picture element characteristic determining step A2.

Figure 19:
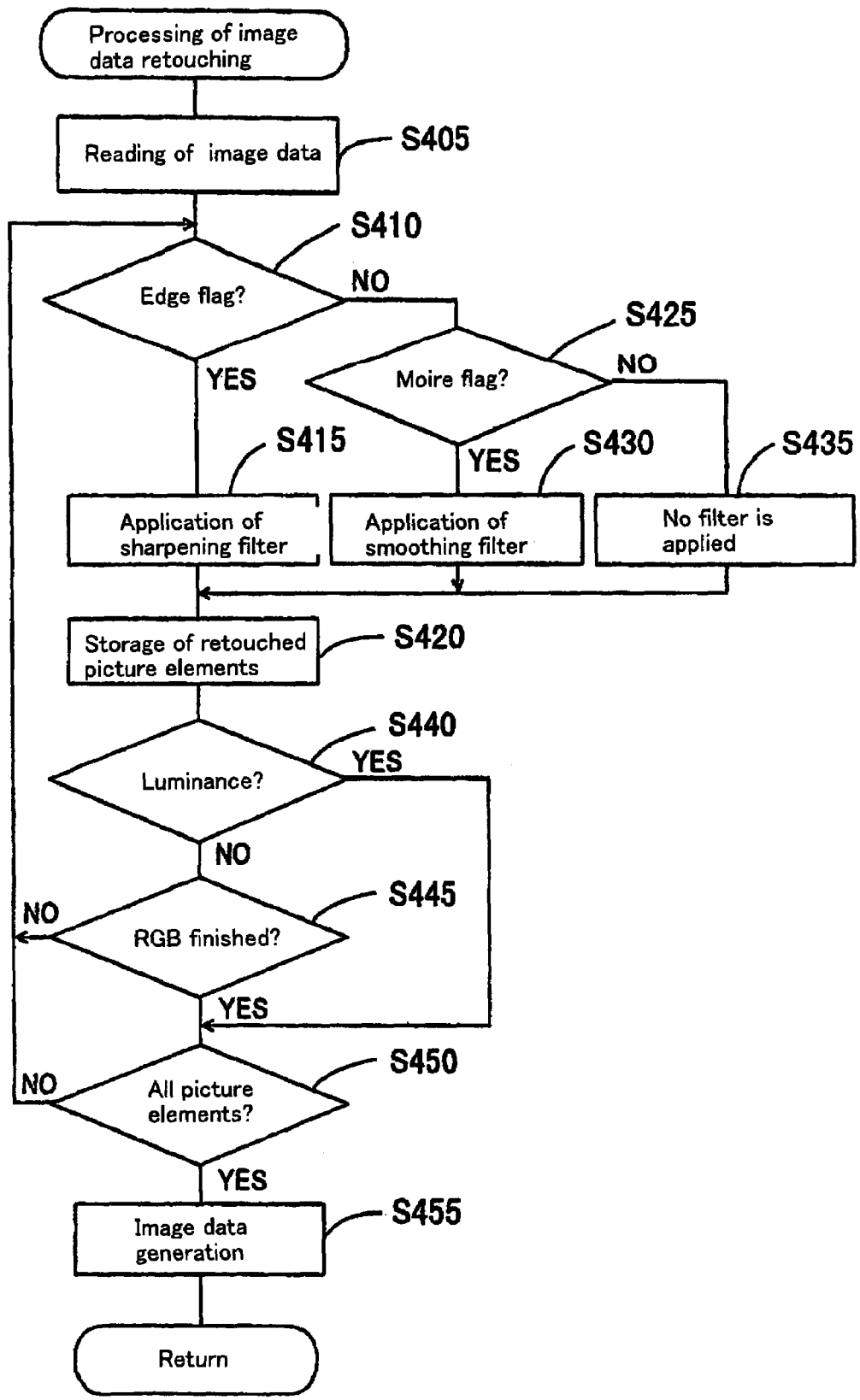
FIG. 19 is a flowchart schematically showing the image data retouching executed by the copy server.

Next, with reference to the flowchart of FIG. 19, how the image data retouching at step S400 is processed will be described.

Figure 20:
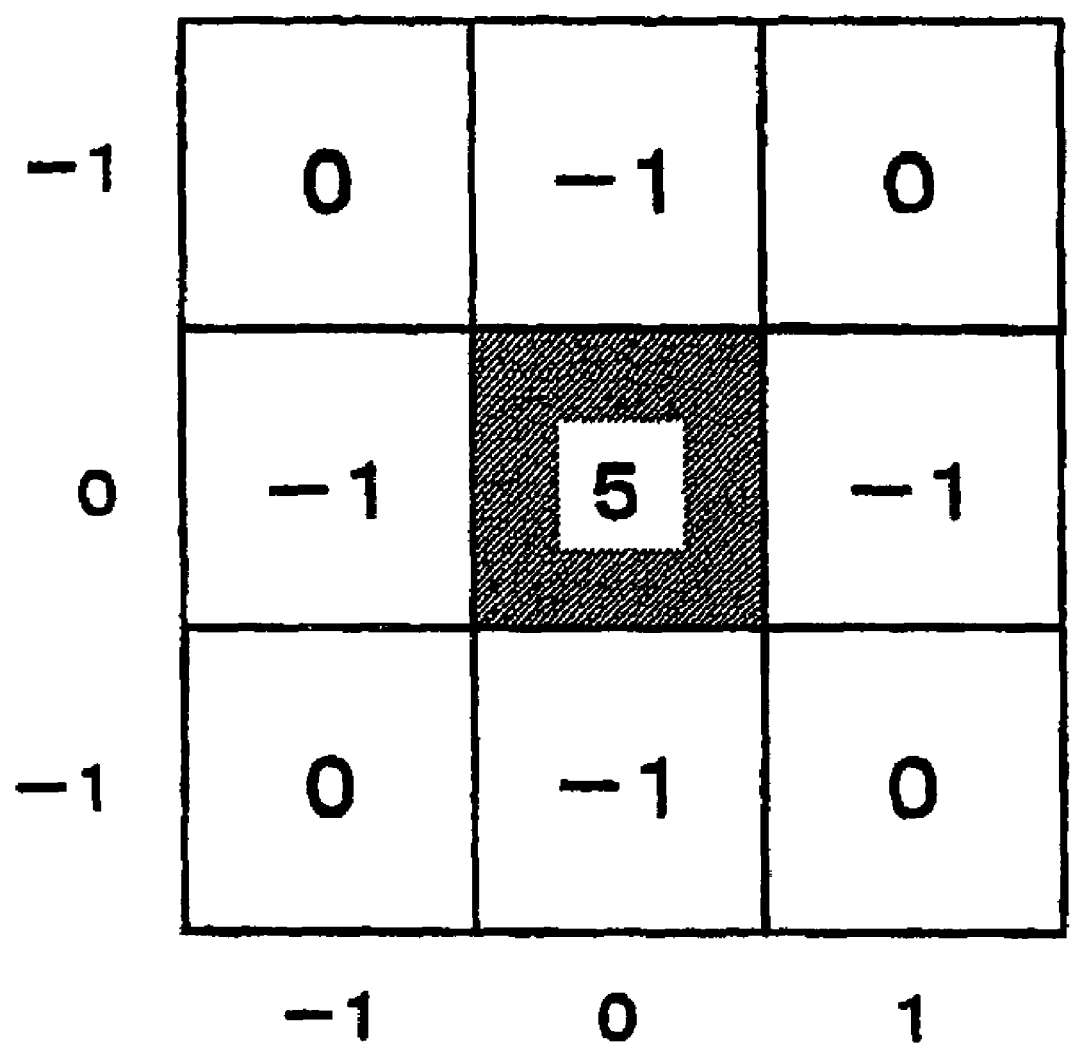
FIG. 20 illustrates an example of sharpening filter.

Referring to the chart, first, image data in which the characteristic flag of each picture element is stored are generated by the above-described scanning, and read out by picture element characteristic determination (step S405). Then the characteristic flag is confirmed for each of the picture elements constituting these image data. First it is determined whether or not the characteristic flag is an edge flag (step S410) and, if it is an edge flag, a sharpening filter shown in FIG. 20 is applied to the pertinent picture elements (step S415). This sharpening filter is formed of a 3*3 matrix, wherein a large coefficient is set for the object picture element in the shaded box; to emphasize this object picture element, a negative coefficient is set for the surrounding picture elements immediately above, below and to the right and left of it; and a coefficient of zero is set for those surrounding picture elements not directly adjoining the object picture element. The application of the sharpening filter can be represented by the following Equation (6), where the tones of the original picture elements are represented by a(N1, N2), and those of the output picture elements after the application of the sharpening filter, by c(N1, N2):

$$c(N1, N2) = \sum_{k1=1} \sum_{k2=1} h(k1, k2)^* a(N1 - k1, N2 - K2) \quad (6)$$

where h(k1, k2) can be converted into the following Equations (7) and (8) in accordance with FIG. 20:

$h(-1,-1)=0, h(-1,0)=-1, h(-1,1)=0,$ $h(0,-1)=-1, h(0,0)=5, h(0,1)=-1,$ $h(1,-1)=0, h(1,0)=-1, h(1,1)=0$ \quad (7)

$h(-1,-1)+h(-1,0)+h(-1,1)+h(0,-1)+h(0,0)+h(0,1)+h(1,-1)+h(1,0)+h(1,1)=1$ \quad (8)

In this mode of implementation, a configuration in which a sharpening filter in a 3*3 matrix form is applied to emphasize the edge picture elements is used, but of course the sharpening filter is not confined to one in a 3*3 matrix form, and one in a 5*5 matrix form can also be used if Equation (8), i.e. the condition that the total of the coefficients in all the boxes be 1, is satisfied, permitting alteration as appropriate. Then, picture elements to which the sharpening filter has been applied are stored as retouched picture elements (step S420).

Figure 21:
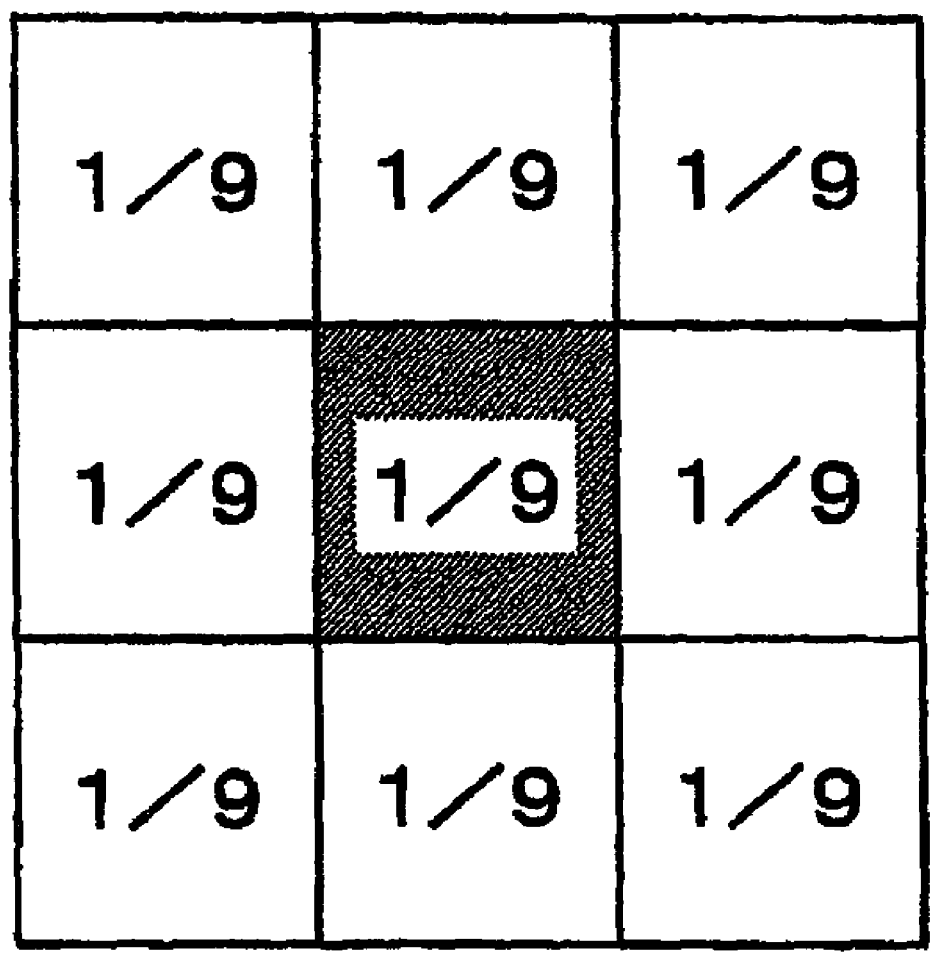
FIG. 21 illustrates an example of smoothing filter.

Or if the characteristic flag is determined not to be an edge flag at step S410, it is determined whether or not the characteristic flag is a moiré flag (step S425). If it is a moiré flag, a smoothing filter illustrated in FIG. 21 is applied to the pertinent picture elements (step S430). This smoothing filter is formed of a 3*3 matrix, wherein the same coefficient is set for the object picture element in the shaded box and the surrounding picture elements to average the tone of this object picture element with that of the surrounding picture elements. The application of the smoothing filter can be represented by the following Equation (9), where the tones of the original picture elements are represented by a(N1, N2), and those of the output picture elements after the application of the smoothing filter, by c(N1, N2):

$$c(N1, N2) = \sum_{k1=1} \sum_{k2=1} g(k1, k2) * a(N1 - k1, N2 - K2) \qquad (9)$$

where g(k1, k2) can be converted into the following Equations (10) and (11) in accordance with FIG. 21:

$g(-1,-1)=1/9, g(-1,0)=1/9, g(-1,1)=1/9,$ $g(0,-1)=1/9, g(0,0)=1/9, g(0,1)=1/9,$ $g(1,-1)=1/9, g(1,0)=1/9, g(1,1)=1/9$ \qquad (10)

$g(-1,-1)+g(-1,0)+g(-1,1)+g(0,-1)+g(0,0)+g(0,1)+g(1,-1)+g(1,0)+g(1,1)=1$ \qquad (11)

In this mode of implementation, a configuration in which a smoothing filter in a 3*3 matrix form is applied to average the moiré picture elements is used, but of course the smoothing filter is not confined to one in a 3*3 matrix form, and one in a 5*5 matrix form can also be used if Equation (11), i.e. the condition that the total of the coefficients in all the boxes be 1, is satisfied, or the coefficients may be weighted as appropriate. For instance, a smaller coefficient may be set for picture elements far from the object picture element, and a large one, for picture elements close to it. The picture elements to which the smoothing filter has been applied are stored as retouched picture elements (step S420).

On the other hand, if the characteristic flag is found not to be a moiré flag at step S425, the pertinent picture elements are determined to be intermediate picture elements, and neither the sharpening filter nor the smoothing filter is applied to them (step S435). Thus the tones of the original picture elements are held at the tones of the output picture elements. These intermediate picture elements, too, are stored as retouched picture elements (step S420).

In executing the image data retouching here, if the selected attribute is RGB, image data retouching needs to be applied to each of R, G and B (step S440, S445). The determination so far described is applied to all the picture elements including edge picture elements, moiré picture elements and intermediate picture elements (step S450), and image data resulting from the application of either the sharpening filter or the smoothing filter to each of the picture elements constituting the original image data are generated (step S455).

In executing image data retouching involving the application of either filter on the basis of the luminance data of the picture elements here, the tones of the RGB data after the image data retouching are represented by R', G' and B', respectively, and those of the RGB data before the retouching, by R, G and B, respectively. If the luminance after the application of the sharpening filter or the smoothing filter to luminance Y is represented by luminance Y', R', G' and B' can be computed by the following Equation (12):

$\Delta Y = Y' - Y$ $R' = R + \Delta Y$ $G' = G + \Delta Y$ $B' = B + \Delta Y$ \qquad (12)

On the other hand, where either filter is applied on the basis of the RGB data of the picture elements, as the filter is directly applied to the RGB data, the R', G' and B' resulting from the multiplication by the filter will become, as they are, the retouched image data.

Since a prescribed filter is applied to the image data acquired by scanning to retouch the image data on the basis of the picture element characteristic determination, the image data retouching constitutes the image data retouching step A3.

The image data having gone through retouching are subjected to color conversion and other processing, and delivered to the color printer 40 to execute printing.

Figure 22:
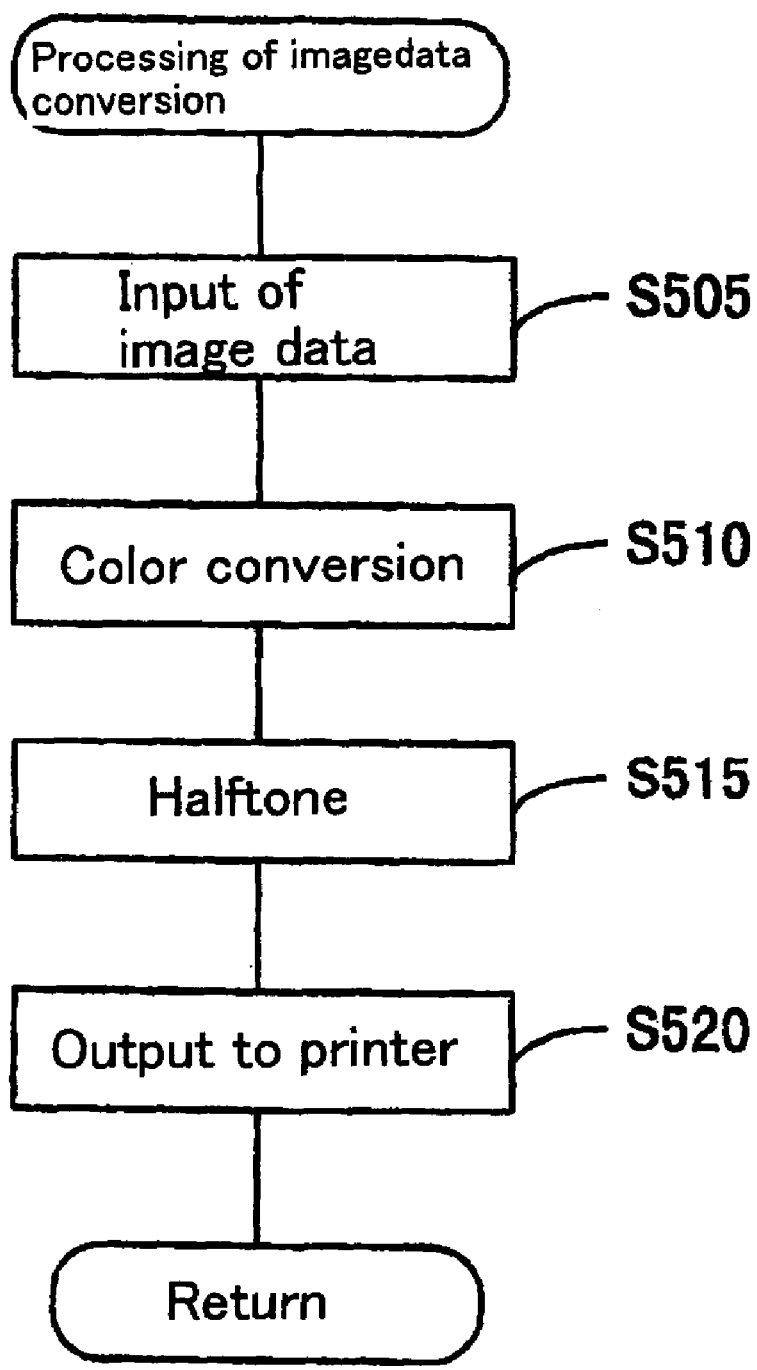
FIG. 22 is a flowchart schematically showing the image data conversion executed by the copy server.

Hereupon, the flowchart of FIG. 22 shows how the image data conversion is executed on the retouched image data before they are delivered to the color printer 40.

Referring to the chart, first the image data retouching is executed, and the image data in which the picture elements are configured according to the output one are entered (step S505) and subjected to color conversion (step S510). If the image data are in the usual RGB 256 tones, the printer 50 will need color image data for printing in CMYK 2 tones, and accordingly color conversion and tone conversion are required. Therefore at step 510, color image data in RGB 256 tones are converted into color image data in CMYK 256 tones. This color conversion may be executed by utilizing LUT in accordance with a standard technique. Then the CMYK 256 tones are converted into halftones of CMYK 2 tones (step S515). The halftone print data are transmitted from the personal computer 10 to the printer 50 by parallel communication (step S520).

Then the color printer 40 enters these print data and executes printing on a print medium. Incidentally, although the positioning of various programs was described along the flow of processing, in practice they are realized in many different modes since a plurality of devices execute them at coordinated timings. Each program may be either executable independent of others or part of some other program. It is also possible to replace processing by software with processing by hardware, and in this context the term "module" refers to common means for both software and hardware.

In this way, it is made possible to acquire image data from an image input device such as the color scanner 20, compute with respect to each of the picture elements constituting these image data differences of tone levels from the surrounding picture elements, prepare a distribution of these differences of tone levels, and determine on the basis of the distribution whether each picture element is an edge picture element, a moiré picture element or an intermediate picture element. Then, in accordance with the determination, the image data are retouched by applying a sharpening filter if they are edge picture elements, or a smoothing filter if they are moiré picture elements, or the tones of the original image are held if they are intermediate picture elements, making it possible to carry out the whole execution from determination to retouching in a serial process. This facilitates simplification of the flow of processing from determination to image data retouching, and at the same time speeding up the processing. Thus the user of the color copying machine 10 is enabled to acquire prints of appropriately retouched images at higher speed.

Furthermore, where luminance data are used as the attribute, after computing the luminance from the RGB data of the picture elements, each step of processing is executed on this luminance, resulting in a simplified configuration of processing and faster image data retouching. Or where RGB data are used as the attribute, each step of processing is executed on the RGB data of the picture elements, resulting in a more elaborate configuration of processing and accordingly slower image data retouching. On the other hand, as each of the RGB data is reflected in the retouching, the quality of retouched image data is enhanced. Therefore the user can select luminance data in the image data attribute selection at step S150 if high-speed image data retouching is desired, or can select RGB data if a high quality image output desired, so that the image data retouching can be accomplished in the desired way according to the occasion.

INDUSTRIAL APPLICABILITY

As hitherto described, since according to the present invention the distribution of differences of tone levels from neighboring picture elements is figured out and the characteristics of the picture elements are determined according to the pattern of that distribution, it can provide a medium on which is recorded an image data retouching program which involves no need for altering the way of determination for each characteristic and, while facilitating determination, increase the speed of process by tightening the linkage to image processing.

According to Claim 2 of the invention, determination can utilize a relatively simple way of summation, merely discriminating the distribution of relatively small differences of tone levels and that of relatively large differences, resulting in a simplified configuration.

According to Claim 3 of the invention, determination can utilize a relatively simple way of summation, that is polarization between positive or negative polarization of distribution, resulting in a simplified configuration.

According to Claim 4 of the invention, edges can be readily determined by combining the distribution of large differences of tone levels and positive or negative polarization.

According to Claim 5 of the invention, suitable processing for edge picture elements can be accomplished by sharpening the edge picture elements.

According to Claim 6 of the invention, since picture elements in a prescribed range around object picture elements are focused on, as in determination, for sharpening with a sharpening filter, resulting in relatively well coordinated determination and image processing.

According to Claim 7 of the invention, moiré can be readily determined by combining the distribution of small differences of tone levels and positive or negative polarization.

According to Claim 8 of the invention, suitable processing for moiré picture elements can be accomplished by smoothing the moiré picture elements.

According to Claim 9 of the invention, since picture elements in a prescribed range around object picture elements are focused on, as in determination, for smoothing with a smoothing filter, resulting in relatively well coordinated determination and image processing.

According to Claim 10 of the invention, there is provided an image data retouching method whereby the configuration of processing for image data retouching can not only be simplified but also increased in speed through collective processing of determination of edge picture elements and moiré picture elements and image data retouching on these picture elements.

According to Claim 11 of the invention, there is provided an image data retouching method whereby the attribute of image data to be retouched in accordance with a prescribed procedure is determined, resulting in greater convenience of use and enabling the user to obtain the output in a more desirable way.

According to Claim 12 of the invention, specific attributes in accordance with which image data are to be handled can be presented.

According to one embodiment of the invention, there is provided an image data retouching apparatus providing similar benefits, and according to another embodiment of the invention, there is provided a similar image data retouching method.

The invention claimed is:

1. An image data retouching apparatus for determining the characteristic of each picture element in image data which express images in a dot matrix form in multiple tones and retouching each picture element in a way appropriate to its characteristic, said apparatus comprising:
    an image data acquisition unit which acquires said image data;
    a picture element characteristic determining unit which determines differences of tone levels between object picture elements, which are the picture elements of the image data acquired by said image data acquisition unit, and neighboring picture elements in a prescribed range around the object picture elements, creates a distribution of said differences and determines the characteristic of each object picture element by comparing the distribution of differences with a model distribution; and
    an image data retouching unit which executes prescribed image processing according to the characteristic of picture elements determined by said picture element characteristic determining unit,
    wherein said distribution of differences is created by placing each of said differences, respectively, in one of a plurality of predetermined categories, and
    wherein said picture element characteristic determining unit utilizes, for determination of the characteristic of each object picture element, the positive or negative polarization of said distribution.

2. An image data retouching apparatus, as claimed in claim 1, wherein said picture element characteristic determining unit utilizes for determination the distribution in a range of smaller differences and the distribution in a range of greater differences.

3. An image data retouching apparatus, as claimed in claim 2, wherein said picture element characteristic determining unit determines picture elements to be edge picture elements if the distribution in said range of greater differences is dominant and if said distribution is polarized positively or negatively.

4. An image data retouching apparatus, as claimed in claim 1, wherein said image data retouching unit executes sharpening of images if said object picture elements are determined to be edge picture elements.

5. An image data retouching apparatus, as claimed in claim 4, wherein said sharpening forms a matrix having a prescribed number of picture elements centering on an object picture element and is executed by a sharpening filter wherein a prescribed coefficient to emphasize the object picture element is set in each picture element position in the matrix.

6. An image data retouching apparatus, as claimed in claim 2, wherein said picture element characteristic determining unit determines picture elements to be moiré picture elements if the distribution in said range of smaller differences is dominant and if said distribution is polarized positively or negatively.

7. An image data retouching apparatus, as claimed in claim 1, wherein said image data retouching unit executes smoothing of images if said object picture elements are determined to be moiré picture elements.

8. An image data retouching apparatus, as claimed in claim 7, wherein said smoothing forms a matrix having a prescribed number of picture elements centering on an object picture element and is executed by a smoothing filter wherein prescribed coefficients are set to roughly average said object picture elements in different picture element positions in the matrix.

9. An image data retouching apparatus, as claimed in claim 1, wherein said image data retouching unit obtains a retouching value for the luminance value of said image data, and adds the retouching value to the tone values of element colors to retouch the image data.

10. An image data retouching apparatus, as claimed in claim 1, wherein:
in retouching the image data of the picture elements, an image data attribute specifying unit for acquiring specification of the attribute of image data to be handled is caused to execute the function thereof, and
said image data retouching unit is caused to execute the function thereof on the basis of the image data having the attribute acquired by said image data attribute specifying unit.

11. An image data retouching apparatus, as claimed in claim 10, wherein said image data attribute specifying unit specifies luminance signals as the attribute when high-speed image data retouching is desired and specifies element color signals constituting an image as the attribute when high-quality image data retouching is desired.

12. An image data retouching method for determining the characteristic of each picture element in image data which express images in a dot matrix form in multiple tones and retouching each picture element in a way appropriate to its characteristic, said method comprising:
an image data acquisition step to acquire said image data;
a picture element characteristic determining step to determine differences of tone levels between object picture elements, which are the picture elements of the image data acquired by said image data acquisition step, and neighboring picture elements in a prescribed range around the object picture elements, a distribution of said differences and the characteristic of each object picture element by comparing the distribution of differences with a model distribution; and
an image data retouching step to execute prescribed image processing according to the characteristic of picture elements determined by said picture element characteristic determining step,
wherein said distribution of differences is created by placing each of said differences, respectively, in one of a plurality of predetermined categories, and
wherein said picture element characteristic determining step utilizes, for determination of the characteristic of each object picture element, the positive or negative polarization of said distribution.

13. A computer readable medium on which is recorded an image data retouching program for determining the characteristic of each picture element in image data which express images in a dot matrix form in multiple tones and retouching each picture element in a way appropriate to its characteristics, said program comprising:
an image data acquisition function to acquire the image data;
a picture element characteristic determining function to determine differences of tone levels between object picture elements, which are the picture elements of the image data acquired by said image data acquisition function, and neighboring picture elements in a prescribed range around the object picture elements, a distribution of said differences and determine the characteristic of each object picture element by comparing the distribution of differences with a model distribution; and
an image data retouching function to execute prescribed image processing according to the characteristic of picture elements determined by said picture element characteristic determining function,
wherein said distribution of differences is created by placing each of said differences, respectively, in one of a plurality of predetermined categories, and
wherein said picture element characteristic determining function utilizes, for determination of the characteristic of each object picture element, the positive or negative polarization of said distribution.

* * * * *